(12) United States Patent
Friedman et al.

(10) Patent No.: US 7,518,119 B2
(45) Date of Patent: *Apr. 14, 2009

(54) PLASMA PANEL BASED IONIZING RADIATION DETECTOR

(75) Inventors: Peter S. Friedman, Toledo, OH (US); Ray A. Stoller, Paulding, OH (US)

(73) Assignee: Integrated Sensors, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/928,311

(22) Filed: Oct. 30, 2007

(65) Prior Publication Data

US 2008/0121809 A1    May 29, 2008

Related U.S. Application Data

(63) Continuation of application No. 11/155,660, filed on Jun. 20, 2005, now Pat. No. 7,332,726.

(60) Provisional application No. 60/580,931, filed on Jun. 19, 2004.

(51) Int. Cl.
*H01J 47/00*       (2006.01)
(52) U.S. Cl. ..................................... 250/374
(58) Field of Classification Search ................. 250/374
See application file for complete search history.

(56) References Cited

U.S. PATENT DOCUMENTS

| 6,011,265 A | 1/2000 | Sauli |
| 6,097,032 A | 8/2000 | Tanimori et al. |
| 2006/0049362 A1 | 3/2006 | Friedman et al. |

OTHER PUBLICATIONS

Contract No. DTRA01-03-C-0042, issued by the U.S. Dept of Defense, Defense Threat Reduction Agency to Photonics Systems, Inc. on May 16, 2003 and completed Oct. 31, 2004.
G. P. Lasché et al., "Detection Sensitivity for Special Nuclear Materials with an Advanced High-Pressure Xenon Detector and Robust Fitting Analysis", IEEE Trans. Nucl. Sci., 48 (2001) 325-329.
F. Sauli, "GEM: A New Concept for Electron Amplification in Gas Detectors", Nucl. Instr. and Meth. A 386 (1997) 531-534.
B. Ketzer et al., "Triple GEM Tracking Detectors for Compass", IEEE Trans. Nucl. Sci., 49 (2002) 2403-2410.

(Continued)

*Primary Examiner*—Christine Sung
(74) *Attorney, Agent, or Firm*—Womble Carlyle Sandridge & Rice, PLLC

(57) ABSTRACT

A radiation detector is formed from a plasma panel that includes a front substrate, and a back substrate that forms a generally parallel gap with the front substrate. X (column) and Y (row) electrodes are coupled by gas discharge events to define one or more pixels. Impedances are coupled to the X and Y electrodes, and a power supply is coupled to one or both types of electrodes. Discharge event detectors are coupled to the impedances.

28 Claims, 10 Drawing Sheets

OTHER PUBLICATIONS

O. Bouhali et al., "The Micromegem Detector", Nucl. Instr. and Meth. A 459 (2001) 211-220.

Glenn F. Knoll, "Radiation Detection and Measurement", 3rd ed. (John Wiley & Sons, Inc., 2000), pp. 192-194 and 509 (*book cover included*).

J. F. Clergeau et al., "Operation of Sealed Microstrip Gas Chambers at the ILL", IEEE Trans. Nucl. Sci., 48 (2001) 1075-1080.

J. E. Bateman et al., "Studies of the Gain Properties of Microstrip Gas Counters Relevant to Their Application as X-Ray and Electron Detectors", IEEE Trans. Nucl. Sci., 49 (2002) 1644-1650.

K. P. Ziock and L. F. Nakae, "A Large-Area PSPMT-Based Gamma-Ray Imager with Edge Reclamation", IEEE Trans. Nucl. Sci., 49 (2002) 1552-1559.

Thorsten Graeve and Gene Weckler, "High-Resolution CMOS Imaging Detector," Medical Imaging 2001—Physics of Medical Imaging, SPIE vol. 4320.

G. J. Mahler et al., "A Portable Gamma-Ray Spectrometer Using Compressed Xenon", IEEE Trans. Nucl. Sci. NS-45 (1998) 1029-1033.

Paul E. Fehlau, "Integrated Neutron/Gamma-Ray Portal Monitors For Nuclear Safeguards", IEEE Trans. Nucl. Sci. NS-41 (1994) 922-926.

V. V. Nagarkar et al., "Structured LiI Scintillator for Thermal Neutron Imaging", IEEE Trans. Nucl. Sci. NS-48 (2001) 2330-2334.

J. D. Kurfess and B. F. Phlips, "Coincident Compton Nuclear Medical Imager", IEEE Nucl. Sci. Symposium (San Diego, 2001) http://heseweb.nrl.navy.mil/gamma/detector/papers/M4-5.pdf.

A. Breskin, "Advances in gas avalanche radiation detectors for biomedical applications", Nucl. Instr. and Meth. A 454 (2000) 26-39.

F. Angelini et al., "The micro-gap chamber", Nucl. Instr. and Meth. A 335 (1993) 69-77.

T. Beckers et al., "Optimization of microstrip gas chamber design and operating conditions", Nucl. Instr. and Meth. A 346 (1994) 95-101.

D. F. Anderson, S. Kwan and M. Salomon, "A low-pressure, microstrip gas chamber operated with secondary-electron emission", Nucl. Instr. and Meth. A 346 (1994) 102 106.

* Seal insert shows panel gas-gap, cross-sectional configuration of Picture-Frame seal.
** Picture-Frame Spacer-Seal, Peripheral Spacers & Internal Spacers all have similar height to maintain uniform gas-gap across panel.

PLASMA PANEL BASED IONIZING RADIATION DETECTOR

RELATED APPLICATIONS

This application is a continuation of U.S. patent application Ser. No. 11/155,660, filed Jun. 20, 2005, which claims priority to U.S. Provisional Patent Application No. 60/580,931 filed Jun. 19, 2004, the specification of which is herein incorporated by reference.

FIELD OF THE INVENTION

One embodiment of the present invention is directed to the detection and imaging of ionizing radiation. More particularly, one embodiment of the present invention is directed to a plasma panel based apparatus for the detection and imaging of ionizing radiation.

BACKGROUND INFORMATION

Many useful applications, such as the detection of radioactive material and computer-assisted tomography ("CAT"), rely on the detection of photon radiation, known as X-ray and/or gamma-ray radiation. Both of these types of high-energy photon radiation cause ionization and for the purposes of this disclosure the two terms, X-ray and gamma-ray, are used interchangeably. In terms of the detection of such ionizing radiation, the spectral region of greatest interest for most applications generally falls between the energies of about 20 to 2,000 keV (i.e., 0.02 to 2 MeV).

In the above spectral range of interest, the primary types of interaction are the photoelectric and Compton effects. The relative contribution from each can be determined in quantitative fashion a priori via the combination of the incident photon energy and the atomic number (i.e., Z-number) of the interacting atom. The photoelectric effect describes a single atomic absorption, whereas the Compton effect describes an inelastic scattering collision that simultaneously results in a Compton recoil electron and a Compton scattered photon. The latter can be inelastically scattered again and again, until the photon either exits or is "absorbed" by the interacting media. Of the two processes, the primary basis for the majority of known ionizing radiation detectors used in imaging applications at photon energies up to at least 200 keV is the photoelectric effect, which causes the initial production of a single "free-electron" and a corresponding positive atomic ion.

In order to detect ionizing electromagnetic radiation, several known sensing devices are commonly used. One of the earliest known electronic devices is the ionization chamber. Detection of radiation in an ionization chamber, such as a Geiger-Müeller ("GM") tube, is based upon electrical conductivity induced in an inert gas (usually containing argon and neon) as a consequence of ion-pair formation.

More recent and sensitive variations of sensing devices include high-pressure xenon ionization chambers, such as the tube disclosed in G. P. Lasché et al., "*Detection Sensitivity for Special Nuclear Materials with an Advanced High-Pressure Xenon Detector and Robust Fitting Analysis*", IEEE Trans. Nucl. Sci., 48 (2001), pp. 325-32, which is designed for portal inspection to detect the presence of $^{235}$U and $^{239}$Pu radionuclides. However, these devices are very expensive and like a GM-tube have no internal pixel structure, so cannot count "simultaneous" electrons created in different spatial regions of the tube, nor be internally configured to function as an imaging detector.

In contrast, a gas proportional scintillation counter ("GSPC") is an imaging device in which gaseous interaction primarily with low energy radiation in a high-voltage electric field causes secondary VUV photons that are detected by VUV-sensitive, photodiodes or photomultiplier ("PM") tubes. Some disadvantages of GSPC's are their limited energy detection range, required use of ultrahigh-vacuum technology and ultrahigh-purity gases, and very short device lifetimes as measured in months.

For thermal (i.e., slow, 2200-m/s) neutron detection, the two-dimensional microstrip gas chamber ("MSGC") is probably the most common known detector, although other related gas-based detectors such as multiwire proportional counters ("MWPC"), multitube position sensitive detectors ("PSD"), and GSPC's are also commonly used. However, these two-dimensional detectors are generally suitable only for large research laboratories that can support highly specialized detector groups, as they are often custom-built and can be difficult to maintain. In addition, they all require ultrahigh purity gas mixtures composed typically of $^3$He or $^{10}$BF$_3$ as the neutron converter and CF$_4$ as the quencher, and operate at positive pressures of about 3 to 20 atmospheres, presenting a potentially explosive hazard.

Several other known gas detector configurations have received considerable attention over the past few years including: gas electron multipliers ("GEM"), microgap chambers ("MGC"), and various combinations of MSGC and GEM detectors such as multiple-GEM, Micromegas and MICROMEGEM. The GEM structures operate in tandem with MSGC's to improve electron gain by charge pre-amplification.

The above-described gas detector configurations were developed primarily for use in detecting either low energy radiation (i.e. less than 10 keV), or very high energy particles (e.g., 300 MeV to 10 GeV pions) in particle accelerators. With regard to the various MSGC configurations (including the MSGC-GEM), they are designed to operate in the "Proportional Region" of the gas ionization curve, having a typical gas avalanche multiplication gain of ~$10^4$.

Currently, the most effective radiation detector is generally considered to be a scintillation counter. The basic scintillation counter consists primarily of two components—a scintillation plate or crystal, optically coupled to a photomultiplier tube or a silicon photodiode. The scintillation plate or crystal contains phosphor type material that produces visible (or ultraviolet) photons upon the occurrence of an absorption/scattering event caused by incident ionizing radiation. Light from the scintillation material, which commonly is NaI(Tl), is transmitted to the photocathode of the photomultiplier, which, through a series of dynodes, amplifies the electrical signal.

Compared to a GM-tube that can have a "dead-time" on the order of 100 µs (microseconds) between counting events, during which time any response to radiation is impossible, a scintillation detector generally has a dead-time of about 1 µs or less. Another advantage of the scintillation detector is that the number of emitted photons produced by the scintillation plate or crystal, upon interaction with ionizing radiation, is approximately proportional to the energy of the incident radiation.

Further, for imaging applications, the scintillation counter is position-sensitive, and can yield good quality, medium resolution images. However, the resolution is limited by several factors, including the plate or crystal thickness, the photocathode spatial resolution, and the spatial separation between the active region of the scintillation plate and the photocathode surface. For the detection of higher energy gamma radiation, higher atomic number (i.e., high-Z) materials are commonly used (e.g., LSO, BGO, CsI, etc.), and/or thicker scintillation crystals (e.g., 3 cm instead of 1 cm). In the case of thicker scintillation crystals, the increased thickness reduces image resolution.

Based on the foregoing, there is a need for a radiation sensor with high resolution capability, fast pixel response, minimal dead-time, improved radioisotope identification, and which can be manufactured in large sizes relatively inexpensively.

SUMMARY OF THE INVENTION

One embodiment of the present invention is an ionizing radiation detector formed from a plasma panel that includes a front substrate, and a back substrate that forms a generally parallel gap with the front substrate. X (column) and Y (row) electrodes are coupled by gas discharge events to define one or more pixels. Impedances are coupled to the X and Y electrodes, and a power supply is coupled to one or both types of electrodes. Discharge event detectors are coupled to the impedances.

DETAILED DESCRIPTION

Figure 1:
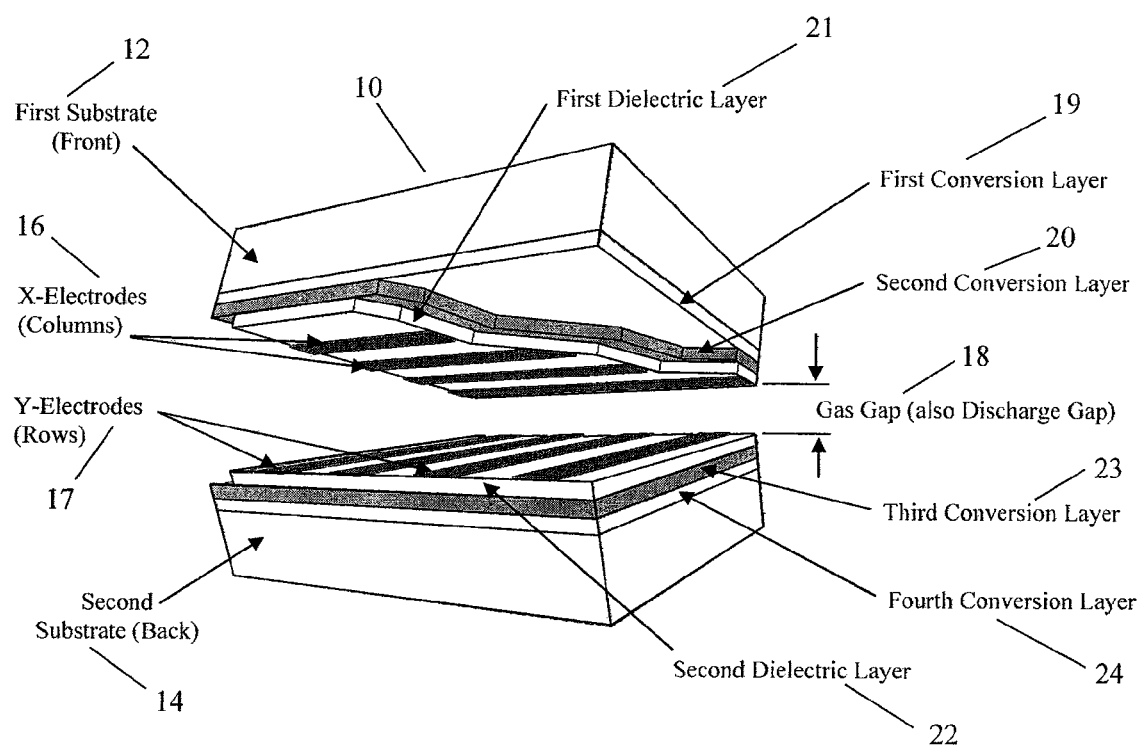
FIG. 1 is a perspective view of a columnar-discharge plasma panel radiation sensor in accordance with one embodiment of the present invention.

One embodiment of the present invention is the use of a gas discharge panel (referred to as a plasma display panel ("PDP") if originally designed for display applications, or plasma panel ("PP") if designed for photon radiation detection) coupled to electronic circuitry to form a plasma panel sensor ("PPS") for detecting radiation.

The PPS in accordance with one embodiment of the present invention can be fabricated with a high resolution pixel structure and in large sizes at very low cost by leveraging into the multi-billion dollar manufacturing infrastructure now in place for the high-growth PDP segment of the consumer electronics industry. Operationally, one embodiment of the present invention is a direct, high-gain, position and intensity sensitive, digital counter/detector of electrons emitted as a consequence of the interaction of ionizing photons (i.e., gamma-rays or X-rays) and/or particles (e.g., fast or slow neutrons) with appropriate materials that can internally convert such radiation into "free-electrons", without having to go through a scintillation conversion step to visible or ultraviolet photons and subsequent detection by an expensive photo-sensing element.

In general, a single, solitary electron (i.e., free-electron) entering the high-field, high-resolution, pixel space of a suitably designed, plasma panel cell in accordance with an embodiment of the present invention can experience almost instantaneous internal electron amplification with a gain of approximately 11 orders-of-magnitude (i.e., $10^{11}$), without external amplification, and without loss of spatial resolution. The resulting electron avalanche, which is both confined and self-contained by the high field that defines each pixel's cell space, occurs within a couple of hundred nanoseconds. The PPS, in accordance with an embodiment of the present invention, does not employ scintillation materials, nor require the use of high-pressure, expensive, high-purity isotopic gases such as $^3$He or $^{10}$BF3, although such gases might be useful for certain configurations/applications.

In a typical alternating current POP ("AC-PDP") designed for video display applications, each "OFF" cell sits at a voltage significantly below the threshold potential needed to initiate a plasma discharge between opposing electrodes. These electrodes are typically covered with a thick-film dielectric for charge storage. The thick-film dielectric is in turn coated on its top surface with a thin-film, secondary-electron emissive) dielectric material (e.g., MgO) having a low work-function that can readily supply electrons to the low voltage discharge gas (typically a neon-xenon mixture) and thereby sustain the plasma discharge which is an electron-amplification avalanche event. With regard to direct current PDP ("DC-PDP") devices, the plasma discharge is typically current-limited by an external series resistor, as there is no dielectric layer (over the discharging electrodes) to store an opposing charge to limit the discharge current. DC-PDPs, for a variety of technical reasons, were never commercialized for video/TV-type applications, but serve a few specialty niche markets, primarily for low resolution, monochrome, alphanumeric applications. In conventional AC-PDP or DC-PDP devices, mechanistically, for the selected discharge cell, the address voltage "boost" that is provided on top of the base voltages yields a composite resultant cell voltage in excess of the "firing voltage" needed to initiate a gas-discharge. Such gas-discharge "firing" events, however only reliably occur if an adequate supply of "priming" electrons are present to help initiate a cell discharge, otherwise a much higher voltage is required to initiate gas breakdown. This latter situation, of being able to set the base cell voltage significantly above the so-called firing voltage due to the absence of priming electrons is the desired condition under which embodiments of the present invention can work best, and is therefore a design goal for device operation with maximum sensitivity.

For a plasma panel to successfully function as a radiation sensor in accordance with an embodiment of the present invention, it is configured such that the "priming" electrons needed to initiate the discharge come from an external source of ionizing radiation (e.g., gamma-rays, neutrons, etc.). This means that the plasma panel should be structurally and electronically designed with a very different set of design rules as those governing its use as a display device. Thus, to maximize sensitivity, the panel should be designed to eliminate or at least minimize all possible internal sources of priming electrons. The greatest reservoir of such electrons in the panel that are "potentially available" to become internal priming electrons, is the stored charge contained on the dielectric surfaces ("walls") interfacing the gas. At any given ambient temperature there will always be a dynamic equilibrium involving gas-phase collisions with the dielectric surface resulting in charges/electrons leaving the surface and entering the gas and thereby becoming priming electrons. Elimination of pixel wall charge is perhaps the single most critical factor with regard to successfully configuring and operating a plasma panel device (AC or DC) as a PPS radiation detector in accordance with an embodiment of the present invention. It is thus necessary to minimize, if not eliminate, as much of the internal panel dielectric structure and materials as possible. This means elimination of internal dielectric barrier structures including walls and ribs of various geometries, as well as the elimination of all phosphor dielectric particles. It therefore also follows that monochrome plasma panel structures configured for direct luminescence from the gas are inherently better suited for use as PPS-devices in accordance with embodiments of the present invention than color panels configured for direct luminescence from a phosphor.

AC-PPS versus DC-PPS Structure

Embodiments of the PPS in accordance with the present invention may be AC ("AC-PPS") or DC ("DC-PPS"). In comparing AC-PPS to DC-PPS configurations, the latter has a device structure and mode of electronic operation much more akin to that of a GM-tube than the former. In particular, like the GM-tube, the DC-PPS in its simplest embodiment of a "columnar-discharge" configuration (as shown in FIG. 1, discussed below), is structured with its "bare" cathode facing a "bare" anode (with no dielectric layer in-between), separated by a gap and filled with a discharge gas. In this structure, the DC-PPS electrodes, like those of the GM-tube, are normally kept at a constant "ready-to-discharge" voltage via direct connection to a steady, well-regulated, DC power supply circuit. Such is not the case with an AC-PPS, which is constantly cycling back and forth between two essentially opposite voltage plateau settings. For the transition period during which the voltage is changing, the device should be unresponsive and radiation-generated free-electrons will be "lost" (i.e., not counted). In addition, a "conventionally" structured AC-PPS device, with dielectric over the discharge electrodes, will require complex drive-waveforms incorporating dielectric wall-charge erase functions (for neutralizing accumulated charge stored from previously lit "on" pixels), which at best can be only partially effective. However, if the stored wall-charge from the top dielectric layer can be efficiently erased, then the AC-PPS structure could offer some important benefits. For example, the AC-PPS top-layer MgO refractory coating could provide a more stable and efficient electron emissive surface than the metallic DC-PPS electrode material. In addition, the AC-PPS emissive thin-film overcoat could be improved upon regarding interaction with ionizing radiation (i.e., absorption and/or inelastic scattering), by replacing the "standard", low-Z, MgO coating with a higher-Z, electron emissive oxide such as $La_2O_3$, $Eu_2O_3$, etc. However, all such candidate secondary-electron emitter materials (like MgO) must be chemically and thermally stable, sputter-resistant, and thermally activated at process-compatible temperatures.

FIG. 1 is a perspective view of a columnar-discharge PPS radiation sensor 10 in accordance with one embodiment of the present invention. Sensor 10 includes a first (front) substrate 12 and a second (back) substrate 14, separated by a gas filled gap 18. Sensor 10 includes column ("X") electrodes 16 and row ("Y") electrodes 17. Sensor 10 further includes a first conversion layer 19, a second conversion layer 20, first and second dielectric layers 21 and 22, and a third and fourth conversion layer 23 and 24. Sensor 10 is a DC-PPS structure. With regard to the structure and materials to be employed on the back plate in FIG. 1, the configuration and materials can mirror those chosen for the front plate as shown. In this way, ionizing radiation (i.e., photons or particles) that passes through the front plate has a chance of interacting with the back plate and having some fraction of generated free-electrons finding their way to the gas and initiating a detection event. However, for economic reasons, some embodiments of the inventions described herein associated with FIG. 1 may utilize a back plate construction that eliminates one or both of the conversion layers 23, 24 and possibly the second dielectric layer 22 (if the second substrate is an insulator), or uses less exotic (i.e., expensive) materials than those employed on the front plate.

The columnar-discharge DC-type structure, as shown in FIG. 1, can be physically converted into a conventional AC-type structure by the addition of a dielectric layer on top of: (1) the front substrate electrodes, or (2) the back substrate electrodes, or (3) both sets of electrodes. However, as discussed above, to maximize sensitivity, PPS-devices in accordance with embodiments of the present invention have minimized internal priming and charge storage, which would normally be thought of as being much more difficult for AC than DC type devices, since charge storage is fundamental to AC-PDP operation. Nevertheless it is possible to minimize charge storage in an AC-PPS, precisely because it is not a display device and does not require a dielectric over the X and Y discharge electrodes or a conventional AC-type sustain/drive waveform. A successful AC-PPS device, like a DC-PPS, should undergo only a single gas-discharge avalanche event, as opposed to a continuum of such events. All of the PPS structures in accordance with embodiments of the present invention that are disclosed in FIG. 1 and other figures below, can therefore be operated not only as DC devices, but also "unconventionally" as AC-type devices (i.e., without the top dielectric layer) by driving them directly with a properly configured and well-regulated AC power supply. For such operation, a highly sputter-resistant electrode system should be used (similar to that used for a DC-PPS). It is noted that the duty-cycle for a PPS will be orders-of-magnitude lower than for a PDP-video monitor, and so a "bare" metallic electrode AC-PPS structure could be quite reasonable.

Surface-Discharge PPS Structures

Figure 2:
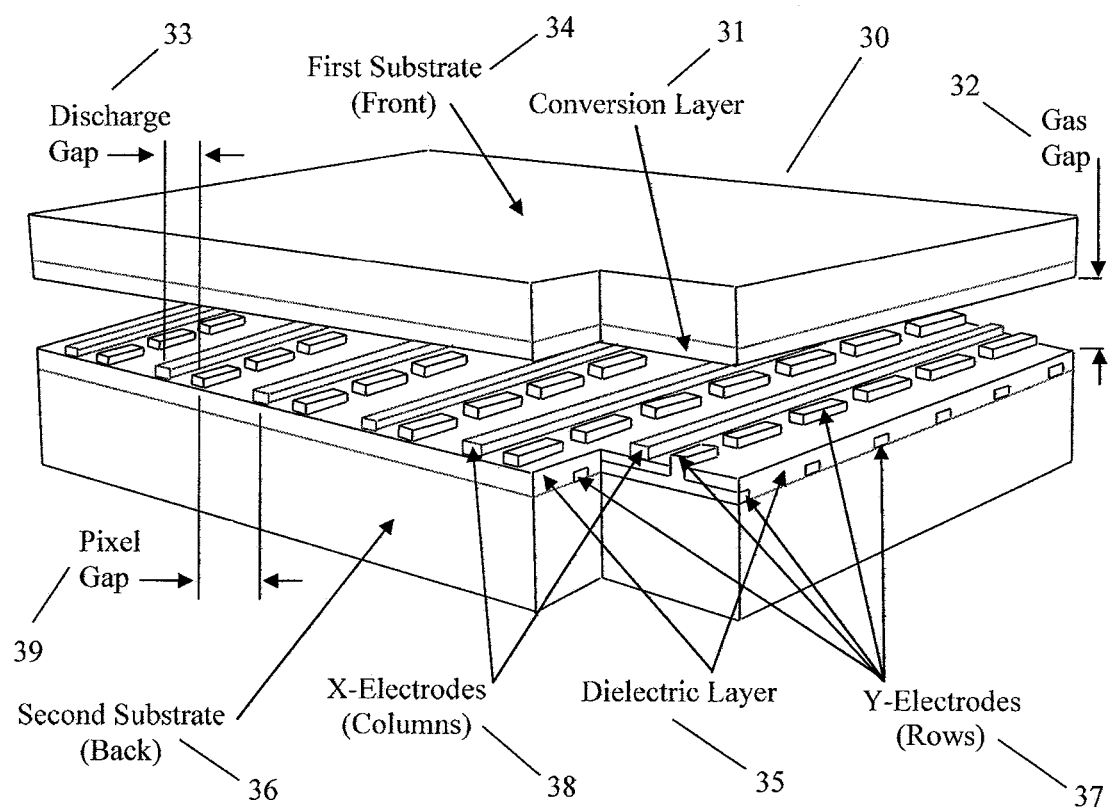
FIG. 2 is a perspective view of a surface-discharge, plasma panel radiation sensor in accordance with one embodiment of the present invention.

Plasma panel configurations are commonly described in terms of their anode-cathode/gas-discharge shape. For example, if the anode and cathode are located on opposite substrates and are orthogonal to one another, such as in FIG. 1, then the gas-discharge between the two plates at the intersection of the orthogonal electrodes assumes a "columnar" discharge volume shape. Alternatively, if the anode and cathode are alongside each other on the same substrate, then the gas-discharge will be confined to the plate surface and assume a "surface" discharge arc shape. Both types of discharge structures have their advantages with respect to a PPS radiation detector, and each of the two basic structures can have many variations. One advantage of the surface-discharge PPS device ("SD-PPS"), as shown in FIG. 2, is that in eliminating the discharge electrode from the first substrate (i.e., moving it to the second substrate in FIG. 2), a degree of freedom is gained with respect to choice of substrate materials, structural modifications and gas gap. With regard to the latter, in a columnar-discharge PPS ("CD-PPS"), the gas gap 18 and the X-Y discharge gap (also 18) are essentially one and the same (see FIG. 1). However, in the SD-PPS (see FIG. 2) the gas gap 32 and the X-Y discharge gap 33 are decoupled and essentially independent of one another. In other words, the SD-PPS structure can permit the use of extremely large gas gaps, on the order of those found in a GM-tube, for enhanced incident photon/particle interaction and therefore increased PPS collection efficacy, with minimal effect on the surface-electrode field strength and X-Y gas discharge dynamics. One such means to physically implement this capability is by adding suitably tall peripheral spacers 128 along the panel perimeter seal 126 (see FIG. 10). For example, the gas "cross-section" media thickness for a GM-tube is typically between 10-100 mm, whereas in a commercial PDP (e.g., a television set) the gas interaction cross-section is only about 0.1 mm. In an SD-PPS, the panel gas-gap 32 (FIG. 2) can be easily increased by at least one to two orders-of-magnitude, for example from 0.1 mm to 1.0 mm, or even to 10 mm or more. In fact, with a "picture frame" type of spacer-preform peripheral structure 128, 129 (FIG. 10, bottom right inset), the gas gap could be made as large as in a GM-tube. By using large gas gaps, the SD-PPS, in accordance with an embodiment of the present invention, could be modified for maximum gas mixture attenuation by employing similar gaseous components as those found in comparable GM-tubes, such as $^3$He based gas mixtures for use with a PPS designed for neutron detection. This possibility is only practical however for SD-PPS type configurations, where the discharge path length is independent of the gas gap and so no sacrifice in pixel/electrode field strength is incurred with the much larger gas gap.

One SD-PPS embodiment, as illustrated in FIG. 2, utilizes a simple, planar design for the first substrate 34 with a single conversion layer 31 for converting incident photon (e.g., gamma-rays) or particle (e.g., neutrons) ionizing radiation into free-electrons that can be emitted into the gas. FIG. 2 is a perspective view of one embodiment of the surface-discharge, plasma panel sensor 30, with first substrate 34, conversion layer 31, and a second substrate 36. Sensor 30 further includes on the second substrate, X-electrodes 38, Y-electrodes 37 and an insulating dielectric 35. First and second substrates 34, 36 form a gas gap 32 which is filled with a gas. The simple SD-PPS structure shown in FIG. 2 relies in part on the close pairing of adjacent X-Y (i.e., column-row) electrodes for gas discharge pixel localization. As can be seen in FIG. 2, the discharge gap 33 for a given X-Y electrode pair is shown to be smaller than the pixel gap 39 between two adjacent pixel pairs. This gap difference is significant and the smaller discharge gap 33, relative to the larger pixel gap 39, is meant to prevent discharge spreading and delocalization, which would amount to loss of image resolution and detection sensitivity. However, the disadvantage of having too large of a pixel gap (or isolation gap as it is sometimes called) is that it reduces the PPS detector spatial resolution and can possibly cause "dead spaces" to develop within the plasma panel, essentially reducing the effective collection area or active fill-factor, thereby reducing the efficacy of the PPS as a radiation detector. Therefore to further enhance discharge localization without reducing image resolution, additional gas discharge panel structural isolation components can be employed. One such embodiment would use internal spacer-barrier walls to achieve cell isolation between adjacent pixel rows and/or columns. Alternatively, either a relatively deep surface depression/trench, or an isolation electrode, can be used to eliminate avalanche spreading by preventing the discharge from jumping transversely across from one X-Y electrode line pair to the next via electrical crosstalk. The use of an "isolating" electrode (with voltage bias) between, and parallel to, each "line pair" of adjacent X-Y surface electrodes has the advantage of being easier to fabricate than a spacer-barrier wall.

A number of surface-discharge configuration variations are possible constituting a family of different SD-PPS embodiments, such as, for example, the use of not one, but two or more conversion layers on the first substrate like those shown for the columnar-discharge structure in FIG. 1. Alternatively, the first substrate itself can function as the conversion layer, thereby eliminating the separate conversion layer 31 shown in FIG. 2. In addition, by not having electrodes on the first substrate, there is no need for a first substrate dielectric layer (as shown in FIG. 1) and to incur the associated problems of: (1) charge storage by the dielectric layer, and (2) inefficient free-electron transport from the conversion layer, through the dielectric layer, and into the gas. In an embodiment utilizing the above properties to advantage, the first substrate can be fabricated out of a conductive conversion layer material (e.g., gadolinium). Similarly, the first substrate is not limited to being a simple, flat, structure, as there can be advantages to using a variety of 3-dimensional substrate shapes such as the external rib structures discussed below and shown in FIGS. 3 and 4. Such 3-dimensional structures, however, are not limited in an SD-PPS to the external substrate surface as they are in a CD-PPS. There are many advantages to using 3-dimensional configurations internally for performance enhancement, sensitivity optimization and source radioisotope identification (see below). For example, the planar conversion layer 31 shown in FIG. 2 can be replaced by a multi-level plateau structure such as the dual-level plateau configurations 49 and 69 in FIGS. 3 and 4 respectively. By such substitution, the 3-dimensional conversion layer surface would be directly interfacing the gas and thereby not have to suffer the inefficiencies and spatial resolution loss associated with having to first pass through a dielectric insulation layer 21, 44, 64 and electrode layer 16, 42, 62 (see FIG. 1, FIG. 3 and FIG. 4), before reaching the gas. The presence of any intermediate media between the conversion layer and gas will cause some amount of attenuation loss of the conversion layer generated free-electrons from reaching the gas and thereby initiating a gas discharge avalanche detection event. Finally, because the discharge gap 33 is independent of the gas gap 32 in SD-PPS structures, such structures have much more tolerance for gas gap non-uniformity and are therefore compatible with reducing and in many cases totally eliminating the need for internal panel spacers (e.g., see internal spacers 112 in FIG. 10).

As previously noted with regard to the CD-PPS structures, all of the SD-PPS structures in accordance with embodiments of the present invention as disclosed in FIG. 2 and in the discussions above and below, can be operated not only as DC devices, but also as either conventional or unconventional AC-type devices (i.e., conventionally with a dielectric layer over the surface electrodes, and unconventionally without such dielectric layer). However, the DC mode of operation would generally be the preferred mode for the reasons previously discussed. Of the two AC surface-discharge configurations, the "unconventional" structure reduces the problem of stored surface charge and so would be easier to implement physically as well as electronically by simply driving the X- and Y-electrodes with a properly configured and well-regulated AC power supply. Further embodiments can employ additional conversion layers 23 and 24 on the second substrate to enhance efficiency by interacting with ionizing radiation that may have passed through the first substrate without attenuation.

To further enhance efficiency, one embodiment of the present invention is a double-surface-discharge PPS ("DSD-PPS") radiation detector that can be operated as above in either the AC or DC mode. The basic advantage of the DSD-PPS is in having relatively independent, active pixel structures on both the front and back substrates for more efficient collection of liberated free-electrons. The SD-PPS structure shown in FIG. 2 can be modified to form a DSD-PPS structure by reconfiguring the first substrate structure to look and function like the structure shown on the second substrate. In one such embodiment, the first substrate would include X1- and Y1-electrodes, with the Y1-electrodes formed in two layers separated and insulated by a dielectric layer as shown for the Y-electrodes in FIG. 2 for the second substrate. Thus in one such embodiment of the DSD-PPS, the first and second substrate structures are essentially mirror images of one another, including both the X-electrode and more intricate Y-electrode configurations. In this embodiment, the two sets of X- and Y-electrodes on the two substrates can operate relatively independent of one another, and as such the electrode orientations of the X1- and Y1-electrodes on the first substrate can be either parallel or orthogonal to the X2- and Y2-electrodes on the second substrate. Similarly, two different power supply circuits are utilized in the DSD-PPS to provide the required voltage potential difference between the X- and Y-electrodes. With regard to relative electrode orientation, it is noted that orienting the two sets of first and second substrate X and Y surface-discharge electrodes orthogonal to one (i.e., X1 perpendicular to X2, and Y1 perpendicular to Y2) another could enhance pixel discharge localization and therefore enable higher spatial resolution sensors.

The PPS as a High Performance, Hybrid Solid State Radiation Sensor

For gas-filled radiation detectors in accordance with embodiments of the present invention, significant reaction to low-energy photon or neutron ionizing radiation can occur both in the gas detection media and the device walls. However, even for device fill-gases with the highest attenuation cross-sections (e.g., Xe for gamma-rays or $^3$He for neutrons), very little interaction can occur in the gas if the device operates at a reduced pressure (e.g., 0.5 atm) and has a small gas gap (e.g., 0.1 mm), as is the general case for the PPS, with the exception of the surface-discharge structures discussed above which can have large gas gaps. With higher-energy radiation, "absorption" will occur almost exclusively in the device walls, assuming that the walls are made of appropriately high attenuation materials—e.g. high-Z materials in the case of gamma-rays, and high interaction cross-section materials for neutrons. Yet only electrons that manage to escape the wall surface into the gas (or are created in the gas) can be amplified and counted. Thus the gas mixture in the PPS does not in general serve as the conversion media, but as a signal amplification media, and for this reason the PPS should not be thought of as a gas detector in the conventional sense, but rather as a hybrid solid-state detector. To maximize the conversion of ionizing-photons or fast/slow neutrons to free-electrons, high-efficiency radiation "absorbing" conversion layers are incorporated into the basic plasma panel structure, such as layers 19, 20, 23 and 24 of FIG. 1. With this addition, the PPS can act as a highly-integrated, macro-array of parallel pixel-sensor-elements capable of detecting a single free-electron generated by incident ionizing photon and/or neutron radiation.

In the voltage domain that the PPS operates, most electrons escaping the panel wall into the gas would be expected to "immediately" (i.e., within ~100 nanoseconds) undergo electron multiplication in the very high electric field (i.e., ~5×10$^6$ V/m) of the nearest pixel. The result of this electron multiplication is a "plasma" gas discharge pulse (i.e., avalanche) that can be "seen" as an activated light-emitting pixel. In all plasma panel devices (whether DC or AC), this process is designed to be self-limiting by virtue of an opposing impedance in series with the pixel that cuts off the discharge by dropping the pixel voltage before too high a current develops. The output pulse from each pixel will therefore always be about the same regardless of the number of "free-electrons" initially entering the same local pixel space at the same moment in time. However, other free-electrons created by the same ionizing radiation, entering a different pixel field space, even at the same time, can create a different discharge and be counted separately. Thus, the number of pixel discharges should reasonably reflect the number of free-electrons created by the incident ionizing radiation. This is the reason that plasma panels, when structured in accordance with embodiments of the present invention, have the capability of acting as intensity-sensitive, digital-counting devices. In this respect PPS-devices can respond to the energy of ionizing-photons in much the same manner as a scintillation counter. However, GM-tubes have no such capability because the entire tube acts as a single pixel and therefore cannot count "simultaneous" electrons ejected spatially from different regions of the cathode wall surface. In essence, given the very high spatial resolution capability of the plasma panel electrode matrix (~0.01 mm), and the small gas gap (e.g., 0.1 mm or less), and fast discharge time (i.e., a few hundred nanoseconds), it is most improbable that multiple free-electrons will enter the same PPS pixel space at the same time, and thereby not be detected. For these reasons, PPS devices in accordance with embodiments of the present invention can be intensity sensitive to incident radiation in a somewhat analogous manner as proportional counters, but with potentially higher spatial resolution and frame update rates (i.e., ~1000 fps) than scintillation-based radiation detectors. The latter, which typically employ PM-tubes, a-Si, CCD or CMOS photon sensors, are much more expensive per unit area than the PPS in accordance with embodiments of the present invention.

PPS Response to Incident Radiation

The spectral energy range of greatest interest for detecting ionizing-photon radiation (i.e., gamma-rays and/or X-rays) for most applications, generally falls between the energies of about 20 keV to 2,000 keV (i.e. 0.02 to 2 MeV). In this range, incident photon attenuation will occur primarily via a combination of photoelectric and Compton effects. Of the two processes, the basis for the majority of ionizing radiation detectors at photon energies up to a few hundred keV is the photoelectric effect, which causes the initial production of a single free-electron and a corresponding positive atomic ion. This region can be extended up to around one-half MeV in energy by the use of high-Z sensor materials. However, at higher photon energies, Compton scattering generally becomes the dominate mechanism. The greater the energy of the incident photon (i.e., up to several MeV), the greater the degree of Compton scattering and hence the broader the required spectral response of the PPS. Yet regardless of mechanism, only those electrons that manage to escape from the device wall into the gas can be amplified and thereby sensed. To take advantage of this conversion effect of ionizing-photon radiation to free-electrons in the device walls, a high-Z, high-density conversion layer(s) is incorporated into the PPS structure, such as conversion layers 19, 20, 23 and 24 of FIG. 1. Yet even without such a high-Z conversion layer, embodiments of the present invention, when tested, were able to be successfully modified to function as ionizing-photon sensors and demonstrated good sensitivity to the following three gamma-my sources (which were the only radioisotopes tested): $^{57}$Co (122 keV), $^{99}$Tc (143 keV) and $^{137}$Cs (662 keV). From a materials design viewpoint, the positive detection results were especially impressive because of the non-optimum materials construction, i.e., the plasma panel walls were of relatively low-Z materials and the thicknesses were wrong for realizing high gamma-ray sensitivity. At least an order-of-magnitude improvement would be expected in plasma panels designed and built from the outset to be PPS radiation detectors (and not display panels) with optimized conversion-layer wall materials, as well as higher E-fields, an improved Penning gas mixture and better elimination of wall charge.

In contrast to gamma radiation, the response of a PPS to slow-neutrons can be either via a single-step or multi-step, particle/photon, reaction process. Yet regardless of mechanism, the first step usually involves (n,α), (n,p), (n,γ) or (n,$e_{ic}$) type reactions; it is noted that the latter reaction constitutes direct emission of an internal conversion electron ($e_{ic}$) upon absorption of a slow-neutron. If the initial step is (n,α) or (n,p), then a second conversion step will follow and most likely involve electron (e) and/or gamma-ray emission. In either case, there will almost certainly be (γ,e) tertiary reactions. In summary, incident slow-neutrons can either directly or indirectly generate free-electrons and gamma-rays, which in turn can be detected by the PPS in accordance with embodiments of the present invention. Thus the efficiency and sensitivity of the PPS to thermal-neutrons at the "front-end" of the detector (e.g., first conversion layer 19 of FIG. 1), will need to be matched by the efficiency and sensitivity of the PPS to gamma-rays and free-electrons at the "back-end" of the detector near the dielectric-gas interface 21 (e.g., the second conversion layer 20).

The PPS in accordance with embodiments of the present invention can also be designed as a fast-neutron detector by modifying the conversion layer(s) material(s) and dimensions. As with conventionally designed neutron detectors, fast-neutrons are more difficult to detect than slow-neutrons, and so PPS sensitivity to fast-neutrons would be expected to be less than that for slow-neutrons. In addition, the choice of suitable solid-state conversion materials for fast-neutrons is more limited than for slow-neutrons, and usually involves incorporating materials containing $^1$H and/or $^6$Li. In the case of the former, saturated hydrocarbon polymers have conventionally been employed such as high-density polyethylene ("HDPE"). In the case of the latter, two frequently chosen materials include $^6$Li$_2$O—SiO$_2$ based inorganic glasses and thick-film or thin-film deposited $^6$LiF coatings. Although the PPS efficiency for fast-neutrons should be less than for slow-neutrons, the basic device advantages would still be retained, such as: low cost for large collection area, high spatial resolution, high internal amplification, high pixel imaging capability, source isotope ID, ambient operation with high signal-to-noise ratio, high fill factor, etc. Most importantly, the novel PPS device structure in accordance with embodiments of the present invention facilitates use of new material possibilities that have the potential to significantly enhance fast-neutron efficiency.

PPS Sensitivity, Detection Capability & Efficiency as a Photon Detector

Experimental results of embodiments of the present invention can be summarized as follows: using less than 3 square inches of active sensor, a modified-PDP was able to detect weak radioisotope emission (i.e., 3.0 μrem/hr) at a distance of 5 feet, or equivalently at 10 feet if two such detectors were located on opposite sides of a 10 ft portal opening. In other words, for cargo/vehicles moving through a 10 ft wide doorway portal, two small (i.e., 2-3 inch) PPS detectors should be able to quickly capture an image of almost any ionizing-photon source emitting radiation at or below the background level. As previously stated, for the PPS gamma-ray detector, at least an order-of-magnitude improvement in sensitivity is expected. However, because the technology is so inexpensive, one would not normally design a passive portal based on only a few square inches of PPS detector. Instead, one would take advantage of the low cost and use at least a few square meters of PPS detector in order to capture high resolution source images, at fast speeds (e.g., 60 mph), and with spectroscopic radioisotope identification.

In comparing the PPS detector in accordance with embodiments of the present invention to a gamma-camera scintillation counter in which the spatial pixel resolution of the latter imager can be on the order of about 3 mm, it is noted that AC-PDPs with a pixel resolution as high as 0.11 mm were produced more than a decade ago. Thus PPS-detectors with order-of-magnitude higher intrinsic pixel spatial resolution than those found on scintillation detectors used in nuclear medical imaging are quite feasible. However, to realize such high spatial resolutions in a PPS imaging system, the apparatus in one embodiment incorporates an appropriately matched, high-resolution collimator plate. In terms of efficiency, there are no obvious limitations to the intrinsic PPS device efficiency. However, intrinsic device efficiency is not actually the critical parameter for most radiation detector applications. Typically, the most important parameter is the system or global efficiency. This is because the only way to beat the $1/r^2$ global efficiency losses, is for the detector system to "cover" the largest possible surface area so as to collect the largest solid angle of emitted radiation. This can only be practically achieved if the detector is very low in cost. The projected PPS-device cost, in accordance with embodiments of the present invention, of just a few dollars per square inch, is at least an order-of-magnitude less expensive than competing "conventional" systems and therefore can be taken maximum advantage of by covering the largest practical detection area to achieve correspondingly high system efficiencies. Given the projected PPS low cost, high sensitivity fast response time, flat form-factor and extreme ruggedness, several intriguing security applications are feasible, including: covering the bottom of a helicopter with PPS-devices in order to "hover" over a ship at sea (or a building) to detect and image a suspected "hidden" radiation source, or to cover the side of a truck or van with such detectors that could then park alongside a suspected building for the purpose of imaging a source hidden within the building.

Multi-level PPS for Extended Spectral Range Optimization

Figure 3:
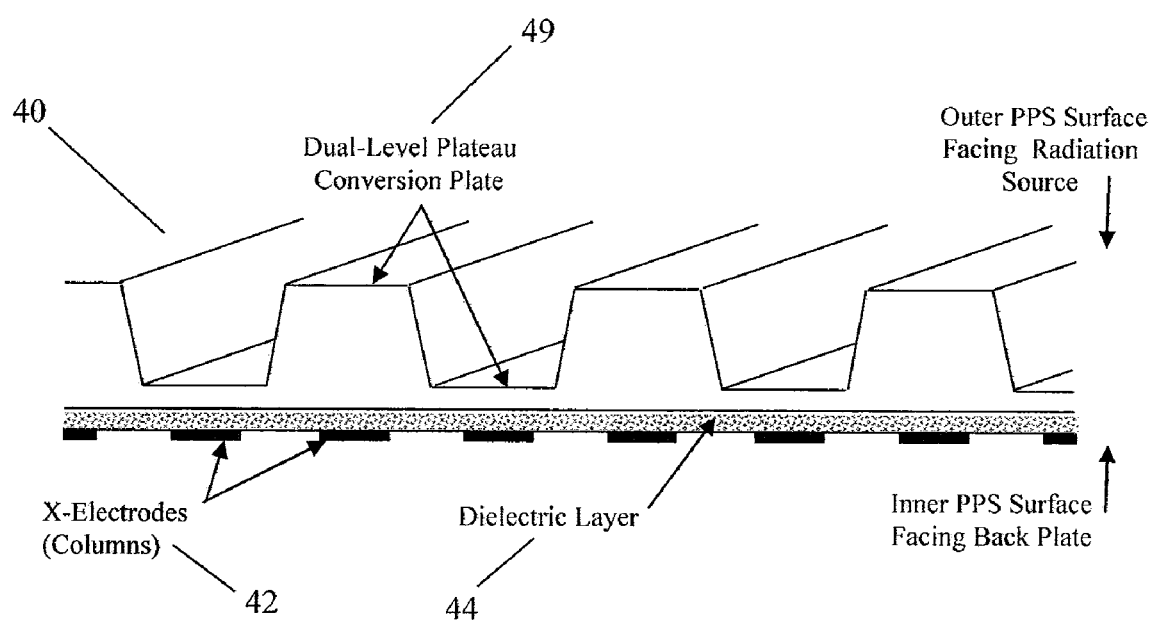
FIG. 3 is a perspective diagram of a front substrate for a dual-level, single-electrode, micro-segmented, columnar-discharge plasma panel radiation sensor device in accordance with one embodiment of the present invention.

For applications involving a variety of possible radioactive sources, such as homeland security, it is desirable that a radiation detector be able to respond with high sensitivity over a broad spectral range. However, such a situation leads to a conflicting choice of device materials, dimensions and optimization solutions. To address this multifaceted need, one embodiment of the present invention is a multi-level device structure as shown in FIG. 3 that can exploit both the photoelectric and Compton effects via a micro-segmented internal PPS configuration that maximizes flexibility to tailor performance solutions to different spectral ranges. FIG. 3 is a perspective diagram of a front substrate 40 for a dual-level, single-electrode, micro-segmented, columnar-discharge PPS device in accordance with one embodiment of the present invention. Front substrate 40 includes column X-electrodes 42, a dielectric layer 44, and dual-level plateau conversion plate 49.

Figure 5:
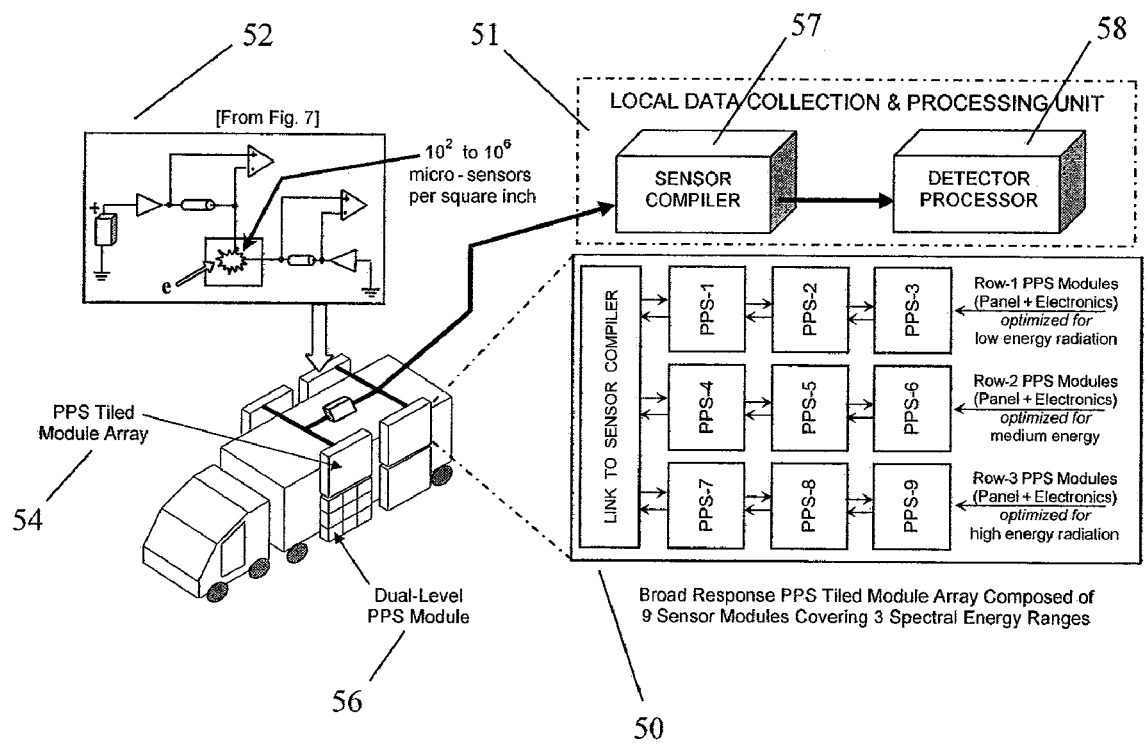
FIG. 5 is a block diagram of an example of a plasma panel radiation sensor tiled modular array system in accordance with one embodiment of the present invention.

At low energies, the front substrate plate 12 and conversion layer 19 of FIG. 1 should have minimal thickness in order to maximize both the incident gamma radiation through the substrate into the conversion layer and the subsequent transport probability of resulting single, low-energy electrons (i.e., generated by the photoelectric effect) making it through the conversion layer to the gas. In an embodiment of FIG. 3, these two functions are combined as the low height plateau region of the conversion plate 49. In contrast, at high energies the substrate thickness is not a problem, as the primary issue is to achieve sufficient Compton scattering interaction of the incident gamma radiation with the conversion layer for efficient generation of Compton recoil electrons (i.e., free-electrons) and subsequent electron transport through the conversion layer into the gas. This latter requirement can be met in the thicker plateau region of the conversion plate 49 as represented in FIG. 3. In one embodiment of this invention, the multi-level PPS front substrate 40 of FIG. 3 is mated to the back substrate 14 of FIG. 1, thereby replacing the front substrate 12 of FIG. 1, to provide an extended range PPS optimization solution. By combining this embodiment, as described immediately above and as conceptualized in FIG. 3, with a modular component approach, an overall system design based on a tiled-array configuration, as shown in FIG. 5 below, can be implemented to achieve optimum system sensitivity over the broadest possible spectral range. An important benefit of the multi-level PPS configuration is that it can be used to great advantage for radioisotope source identification as discussed below. In its most basic embodiment, the "multi-level" PPS can be configured as a dual-level, single-electrode, micro-segmented PPS, the front substrate of which is shown in FIG. 3.

The PPS front substrate 40 in FIG. 3 can be viewed as an embodiment of the PPS-device 10 shown in FIG. 1. The primary differentiating feature is the dual-level plateau conversion plate 49 of FIG. 3, which can be viewed in terms of FIG. 1 as simply representing a "patterned" front substrate 12 combined with a first conversion layer 19, and with the second conversion layer 20 omitted. The preferred material for the dual-level plateau conversion plate would most probably be a high-Z metal, such as a tungsten alloy, that could be conveniently cast or formed into the pattern shown in FIG. 3. The back substrate for the dual-level, single-electrode, micro-segmented PPS can be essentially identical to that shown in FIG. 1 for the standard PPS structure, but with the requirement that the back substrate materials be closely matched to the front conversion plate in terms of linear coefficient of thermal expansion. It is noted that front substrate 40 in FIG. 3 does not have to be a metal; it could also be a patterned ceramic (or glass) incorporating such high-Z materials as: $WO_2$, $HfO_2$, etc. If the front substrate is a high-Z insulator, then dielectric layer 44 in FIG. 3 (and 21 in FIG. 1) can be eliminated and the X-electrodes 42 in FIG. 3 (and 16 in FIG. 1) can be deposited directly onto the back of the patterned dual-level conversion plate 49.

Of particular importance in constructing a multi-level PPS in accordance with embodiments of the present invention is to utilize different thicknesses of converter plate material (i.e., plateau's) for different optimization solutions over a broad range of incident photon/particle energies. In principle, a variety of plateau thicknesses could be incorporated within a single multi-level PPS device, alternatively a variety of different dual-level PPS devices, each optimized for a different spectral range, could be tiled to form a single array structure. The latter choice is probably the more practical, and is discussed in more detail below.

Radioisotope Identification via PPS Spectral Response Transform

The dual-level, micro-segmented, PPS front substrate of FIG. 3 can be designed to take additional advantage of the inherent high spatial resolution resulting from the internal device micro-discharge cell structure. A trapezoidal cross-sectional shape is shown in FIG. 3 (although other shapes could be used) for the dual-height plateau structure making up the outer, top surface of the conversion plate for each PPS module of a module embodiment as shown in FIG. 5 below. As shown in FIG. 3, the discharge electrodes located on top of the flat inner dielectric surface are parallel to, and electrically isolated from, the "outer-rib" or grooved structure, and are by design centered alternately under either a thin or thick plateau layer of the outer-ribbed conversion plate. For a given ionizing-photon flux failing upon the ribbed conversion plate, a series of uniquely defined gas-discharge intensity ratio differences should be observed (within each PPS) between electrodes centered under a thin versus a thick conversion plate plateau. Each individual electrode ratio value is called an "alternate-electrode module intensity ratio" or AEMI-ratio. The matrix or family of AEMI-ratios thus corresponds to a unique spectral response function that directly relates to the PPS structure and the incident spectral energy distribution of the source radioisotope(s). The ribbed conversion plate 49 of FIG. 3 can thus be conceptualized as somewhat analogous to a "grooved transmission grating" for generating a "free-electron spectral response transform" represented by the AEMI-ratio. The matrix of observed and measurable AEMI-ratio is thus a function of the incident gamma-ray distribution, and should in principle be calculable from the PPS device dimensions, material attenuation coefficients, material electron emissivity (i.e., electron-fraction associated with photoelectron and Compton-recoil-electron emission), material electron transport, conversion layer surface-work-function for electron ejection into the gas, etc. The above parameters are either known entities or can be estimated computationally (e.g., using Monte Carlo modeling tools) or measured experimentally. A given PPS module could be calibrated by generating an experimentally verifiable "module response look-up table" of AEMI-ratio values corresponding to various radioisotopes of interest. An unknown radioisotope would thus be identified by comparing the "measured sample" AEMI-ratio to that in a system look-up table residing in the detector processor 58 in FIG. 5 as discussed below. A mixture of radioisotopes passing through the grooved conversion plate would thus generate a free-electron based spectrum of AEMI-ratio values requiring de-convolution algorithms in the detector processor to identify the source radioisotopes. The above methodology is conceptually similar in many ways to the de-convolution of a complex Fourier transform in conventional optical spectroscopy to identify and analyze unknown source materials.

Figure 4:
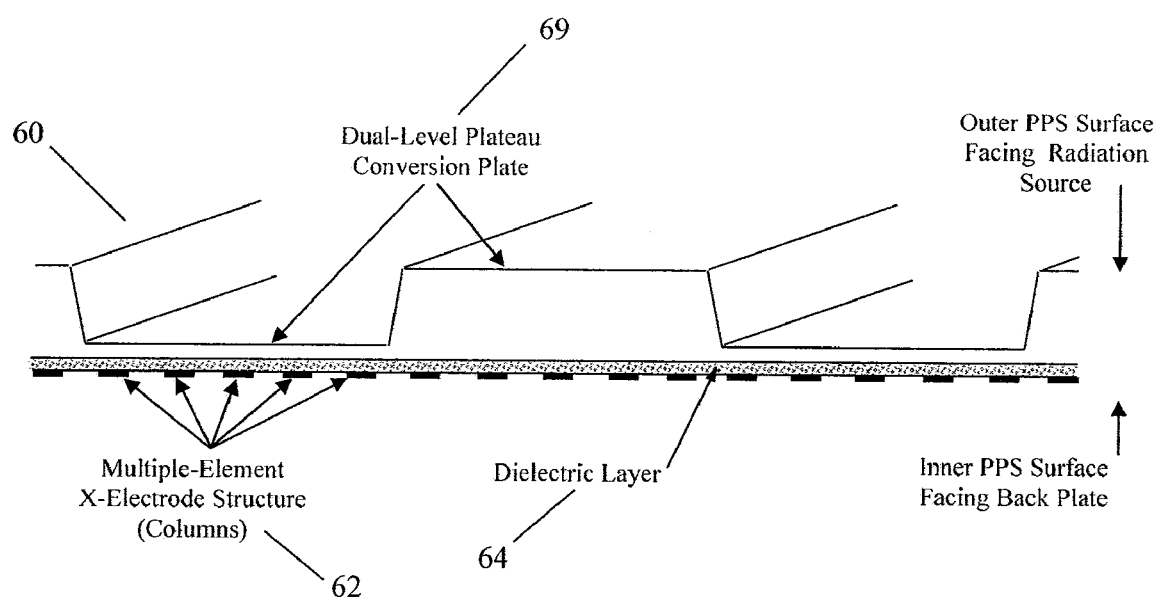
FIG. 4 is a perspective diagram of a front substrate for a dual-level, multi-electrode, micro-segmented, columnar-discharge plasma panel radiation sensor device in accordance with one embodiment of the present invention.

Achieving PPS optimization, including critical configuration, structural and materials selection, in terms of various embodiments of the present invention, especially with regard to the above AEMI spectral response transform, should be theoretically guided but empirically based. For example, if a triple-electrode configuration under a suitably wider plateau were to improve device sensitivity and source radioisotope identification with regard to a modified AEMI-ratio, then a triple-electrode PPS configuration should be employed. By extension, the use of a significantly wider plateau area on the conversion plate top surface, in conjunction with a correspondingly wider multi-electrode pattern at the bottom surface (i.e., just below the plateau base region), provides an alternative configuration for source radioisotope identification, as shown in FIG. 4. FIG. 4 is a perspective diagram of a front substrate 60 for a dual-level, multi-electrode, micro-segmented, columnar-discharge PPS device in accordance with one embodiment of the present invention. Front substrate 60 includes multiple element column X-electrodes 62, a dielectric layer 64, and dual-level plateau conversion plate 69.

The viability of the above modified configuration is based upon the fact that the greater the energy of an incident gamma-ray photon, the greater the degree of Compton scattering and hence the larger the number of subsequent photon-electron scattering events occurring in close proximity to the original interaction site. With respect to the resulting multi-electrode discharge pattern at the bottom of the corresponding wide-ribbed outer structure plateau (shown in FIG. 4), the number of neighboring/adjacent discharging cells should be directly related to the initial photon scattering pattern within the conversion plate and thus the energy and identification of the source radioisotope. A modified AEMI-ratio comparison of the resulting Compton "cluster" or "balloon" scattering pattern associated with thick vs. thin plateau regions can be generated as described in the previous paragraph. As above, final source isotope identification would be made using an empirically-based, look-up table.

In summary, for the dual-height, micro-segmented PPS module, two alternative configuration variations (i.e., FIGS. 3 and 4) of the newly conceived AEMI-ratio method for source radioisotope identification are described to eliminate the problem of "false-positives" from naturally occurring radioactive sources and/or other innocuous interferences (e.g., $^{40}$K found in ceramic tiles, concrete, kitty litter, fresh produce, etc., or $^{99}$Tc injected into persons undergoing diagnostic medical nuclear imaging). It is worth noting that the drive voltage(s) for the PPS electrodes can also be dynamically adjusted to facilitate a totally different type of energy distribution spectrum for a given source radioisotope. Also, the initial current response of each pixel as it builds up to avalanche should be representative of the particular energy distribution of the source free-electrons as they leave the conversion layer and enter the gas. These additional methods could be combined to produce a more comprehensive "identification fingerprint" of an unknown source should they be needed. Since each radioactive source should have its own unique material fingerprint signature with regard to the above-described methods, these could be programmed into the detection processor 58, shown in FIG. 5 and compared to the unknown source as it moves past the PPS in real-time.

PPS Modular Design Architecture: A Tiled-Array, System

To minimize system cost and maximize apparatus design flexibility and performance, one embodiment of the present invention is a modular design based on integrating a number of different, so-called "standard" PPS sensor modules, each optimized for detection within a specific spectral range or for identification of a specific group of radioisotopes, to form a large area, "global" detector array system. More specifically, by combining a multi-level device structure such as shown in FIGS. 3 and 4, with a modular component approach, an overall system based on a "tiled-array" configuration can be achieved for enhanced radioisotope identification with maximum detection sensitivity over the widest possible spectral range. Conceptually, such detector arrays could be interconnected with their electronics and control systems as shown in FIG. 5. FIG. 5 is a block diagram of an example of a PPS tiled modular array system 50 in accordance with one embodiment of the present invention. System 50 includes detection circuitry 52, and a grouping of PPS tiled module arrays 54 formed from multiple dual-level PPS modules 56, the front substrates of which are shown in FIGS. 3 and 4. System 50 further includes a local data collection & processing unit 51 composed of a sensor compiler 57 and detector processor 58. For such a system as shown in FIG. 5 the individual modular units making up each array can be interconnected to provide improved, broad-band, high-resolution, source imaging and source radioisotope spectroscopic identification. With regard to the latter, the larger the array system collection area, the stronger the detection signal and hence the higher the system spectroscopic energy resolution in terms of mixed source radioisotope identification (i.e., resolving overlapping spectroscopic line structures from a radioisotope mixture). It is noted that the source imaging capability can be enhanced for any application by the use of multiple detector array units such as is commonly employed in scanning nuclear medical imaging or in optical astronomy, or in certain security systems such as the embodiment shown in FIG. 6.

Figure 6:
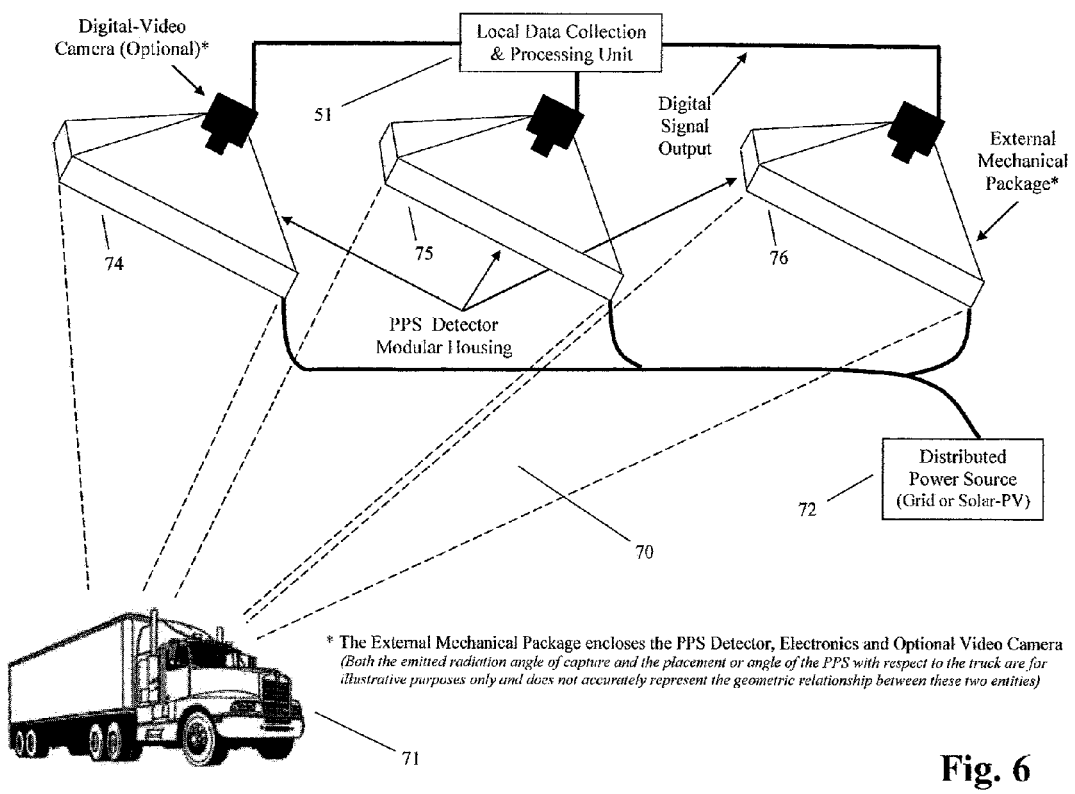
FIG. 6 illustrates an example of a linked plasma panel radiation sensor local area network detection system in accordance with one embodiment of the present invention.

If the various PPS tiled module arrays making up a detection system, such as the embodiment in FIG. 6, are separated by some distance, then a "pseudo-contiguous" detection signal can be extracted through implementation of an integrated aperture synthesis technique similar in concept to the commercial firmware commonly used in digital cameras and video monitor scalars for pixel interpolation. More specifically, the so-called dead-spots between adjacent arrays can be handled with software in a manner somewhat analogous to the way in which the human brain handles the "blind spot" at the center of the human eye's retina.

FIG. 6 illustrates an example of a linked PPS local area network detection system 70 in accordance with one embodiment of the present invention. System 70 includes a plurality of PPS detector modular housings 74-76 that are coupled to a local data collection & processing unit 51, which is functionally the same unit as shown in FIG. 5. Each housing in FIG. 6 includes a PPS detector and electronics in accordance with embodiments of the present invention, and an optional digital-video camera. If such a camera is employed, then the PPS electronics can be located along the module sides instead of at the module back, and the camera augmentation 96 would be configured as described below for FIG. 8. The digital output of housings 74-76 is sent to unit 51, and housings 74-76 may be powered by a distributed power source 72. Through such a system shown in FIG. 6, nuclear materials carried on vehicle 71 can easily be detected.

The digital video camera shown below in FIG. 6, is one option for the recording of pixel discharge events in the PPS-detector. The more likely option would be to detect pixel discharge events directly through the discharge electronic circuitry 52 shown in the top-left inset of FIG. 5, and discussed in more detail below. Note that array control aperture synthesis, etc. might be performed in a "central processor" located some distance away. Interconnect could be via high speed USB, Firewire, Ethernet, etc. from the individual computer interfaces of each module in the array. Each module would require adequate processing and memory to allow for buffering, protocol and transport of its respective data frames or files to the computer system System 50 of FIG. 5 incorporates the concept of what is referred to as "row-segmentation", in which different rows can have different spectral sensitivity, but with all PPS modules within a given row being identical. For example, Row 1 in FIG. 5, consists of three identical dual-level PPS modules (i.e., PPS-1 to PPS-3), each identically optimized for response to incident radiation of low energy, for example 20 to 100 keV. Similarly, Row 2 consists of three identical dual-level PPS modules (i.e., PPS-4 to PPS-6), each optimized for incident radiation medium energy, for example from 100 to 500 keV. Finally, Row 3 consists of three identical dual-level PPS modules (i.e., PPS-7 to PPS-9), with each module optimized for the high energy region, for example from 500 to 3,000 keV. The global array detection system depicted in FIG. 5, thus consists of 9 dual-level PPS modules, segmented into 3 spectral regions utilizing 3 distinct PPS optimization designs, which by way of example cover the region from 20 keV to 3 MeV. However, the number of modules, level of row segmentation, and number of individual dual-level PPS optimization designs, could easily be an order-of-magnitude greater than that shown in the figures and discussed above. It is noted that the term PPS "module" specifically refers to the combination of plasma panel "sensor head" (e.g., FIG. 1-4) coupled to the plasma panel head "local" electronic circuitry 52 in FIG. 5.

PPS Internal Structure & Efficiency as a Neutron Detector

The PPS in principle has the possibility of having a higher efficiency than conventional slow-neutron imaging detectors, because the PPS has the capability of detecting thermal-neutrons via at least three (3) independent, parallel mechanisms operating simultaneously. The three mechanisms are: (a) direct detection in the gas of internal conversion electrons generated in the conversion layer, (b) detection of free-electrons generated by charged particle interactions resulting from incident neutron absorption in the conversion layer, and (c) detection of free-electrons generated within the second conversion layer 20 of FIG. 1 via a neutron-capture "prompt" gamma-ray reaction in the first conversion layer 19 for an embodiment of the invention as shown in FIG. 1. Of these three mechanisms, the first one is a single-step (i.e., direct electron) conversion and should therefore be of higher efficiency than the multiple-step conversions.

An example of a materials structure based on FIG. 1 and designed to take advantage of the first mechanism (i.e., direct collection of internal conversion electrons), would be to use a coating of Gd metal for the first conversion layer 19, with a thin Gd oxide ($Gd_2O_3$) coating on top that would serve the triple role of: second neutron conversion layer 20, secondary electron surface emitter to the gas, and electrode dielectric insulator 21. The X-electrodes 16 might also be of Gd metal which could provide an efficiency advantage, or some other suitable metal such as Ni, or even a metal alloy such as Gd—Ni. The bottom substrate could be a materials mirror image of the top, but with a suitably thin and "transparent" Gd metal coating (or transparent tin-oxide coating) as the fourth conversion layer 24. It is noted that in the embodiment just described, the conversion layers 20 and 23 would also serve as the dielectric insulator layers 21 and 22 respectively, thereby eliminating a layer from each substrate. Additionally, by the conversion layers closest to the gas (i.e., 20 and 23) being thin, and the conversion layers closest to the substrate (i.e., 19 and 24) being metallic, the latter would be designed to remove any stored charge accumulated by the former. Finally it is noted that the advantages of using Gd in the above embodiment are significant, as it has the highest thermal-neutron cross-section of any element, is a highly efficient source of "internal conversion" electrons upon slow-neutron absorption, and is an efficient emitter of low energy, gamma-rays upon slow-neutron capture (i.e., the strongest gamma-ray transition for $^{157}Gd$ occurs at 182 keV, and its conversion electron at 72 keV is emitted in ~39% of its slow-neutron capture reactions).

In spite of the ability to detect neutrons via several parallel and simultaneous mechanisms, the structure of the PPS in FIG. 1 is both simple and elegant (i.e., inexpensive). However, depending upon materials and efficiency optimization, the final structure in embodiments of the present invention could be a modified version of FIG. 1. For example, it might not be necessary to have two conversion layers, as the first and fourth conversion layers 19, 24 could be incorporated into a metallic substrate 12, 14 that could for example could be Gd metal or a Gd alloy such as Gd—Ni. If such were the case, then a thin dielectric such as $Gd_2O_3$ would be required for electrode isolation and could serve a dual role as combined conversion layer 20, 23 and dielectric layer 21, 22. As described above, the electrodes 16, 17 could be Gd or Gd—Ni or some other metal. In addition to the above properties, the Gd—Ni/$Gd_2O_3$/Gd—N system would have the double advantage of serving as a combined gamma-ray and slow-neutron detector. Alternatively, if the substrate was an efficient neutron absorbing and electron emitting glass with some slight conductivity (e.g., from $^6Li_2O$) to eliminate wall charge, then the electrodes could be placed directly on top, facing the gas. Finally, PPS devices structured as neutron detector modules (e.g., Row 1 in the tiled modular array 50 of FIG. 5) could be integrated with PPS modules structured as gamma-ray detectors (e.g., Rows 2, 3, etc.) into a single global array system (such as shown in FIG. 5) capable of detecting both slow and fast neutrons as well as photon radiation over a broad energy spectrum.

As previously discussed, embodiments of the present invention can be designed as a fast-neutron detector. Unfortunately, fast-moving neutral particles normally have much greater penetration through a given material medium than slow-moving neutral particles. Hence, fast-neutrons are inherently less likely to react in such a manner as to create a detectable event, and so such detectors typically operate at significantly lower efficiency than slow-neutron detectors. However, as discussed below, the novel PPS device structure of the present invention offers a number of interesting possibilities for maximizing fast-neutron detection efficiency beyond what might be typically achieved using conventional fast-neutron detectors, and at lower cost.

Conversion of Slow-Neutrons to Free-Electrons

As discussed above, the conversion of incident slow-neutrons to free-electrons can be either a single-step or multi-step process. The efficiency of this process for a given device structure, such as that shown in FIG. 1, will depend primarily on the choice of materials and the material thickness dimensions. For example, since the initial critical interaction is neutron absorption, materials having high neutron absorption cross-sections are obviously desirable, but the material branching ratio's and Q-values are also of great import. A material may be good at absorbing neutrons, but if the resulting product(s) are not useful with regard to the detection mechanism, then the absorbed neutron will simply be "lost" and not counted. To be efficient in terms of both neutron conversion and subsequent event detection, the candidate material upon neutron absorption needs to emit "internal conversion" electrons, and/or useful gamma radiation, and/or energetic particles that in turn can generate electrons and/or useful gamma radiation, etc. By invoking the term "useful" gamma radiation, what is meant is gamma radiation of high enough energy that it can reach the inner conversion layer close to the gas, so that the resulting free-electrons are able to make it through the remaining conversion layer thickness and enter the gas and cause an avalanche and be counted. If however, the emitted gamma radiation is too high in energy, it will have a low probability of further interacting with the detector and can pass right through without being counted.

Candidate materials for the conversion layer can include the following isotopes: $^6$Li, $^{10}$B, $^{149}$Sm, $^{155}$Gd and $^{157}$Gd. Some of these materials, such as B and Gd, might be applied as a thin coating in their pure state, while others could be in the form of compounds such as BN and/or $Li_3N$. Essentially all of these materials need to be considered in their pure oxide form (i.e., $Li_2O$, $Gd_2O_3$, $Sm_2O_3$, etc.), except perhaps boron, which probably needs to be combined with other oxides to create a stable glass. It is noted that a combination glass system incorporating, for example, the oxides $^6Li_2O$ and/or $^{10}B_2O_3$ either individually or together, such as in a lithium-borate, lithium-borosilicate or lithium-aluminoborosilicate glass (perhaps even enhanced with $Gd_2O_3$, etc.), might serve the dual function as both substrate and conversion plate. As an added benefit, the above oxides tend to have low work-functions with respect to secondary electron emission and so are electron emissive. It is noted that for a variety of reasons, one embodiment of the present invention would include the $Gd/Gd_2O_3$ system for the reasons provided above.

As previously discussed in conjunction with Surface-Discharge PPS Structures, it was disclosed that one advantage of the SD-PPS is the capability of employing large gas gaps without adversely affecting the local gas discharge pixel field. In particular, one such embodiment was mentioned in which $^3$He based gas mixtures could be used for neutron detection. However, both $^3$He and $BF_3$ gas mixtures are commonly used as detection media for slow-neutron radiation detectors and as such could be employed in an embodiment of the SD-PPS structure 30 shown in FIG. 2, or alternatively the DSD-PPS variant of that embodiment could be employed as previously described.

Conversion of Fast-Neutrons to Free-Electrons

Essentially any slow-neutron detector can be "made" into a fast-neutron detector by simply surrounding it with a suitable moderating medium to slow down and reduce the energy of fast-moving incident neutrons, thereby converting them into slow-neutrons. Unfortunately, this brute-force method suffers from three major problems. First, the moderating process by its very nature destroys the incident particle energy information, thus eliminating all knowledge related to the source energy spectrum needed for source identification. Second, the process in its entirety tends to be slow (e.g., hundreds of microseconds) due to the time lag associated with multiple collisions occurring within the moderator in order to "thermalize" the fast neutrons, followed by slow diffusion of the resulting thermal-neutrons from the moderator to the active detector. Finally, the moderating media introduces efficiency losses due to a combination of moderator neutron parasitic capture reactions and moderator thickness (i.e., path length) making successful diffusion of thermalized-neutrons to the active detector site a more difficult and less probable event. Because of the above problems, the preferred detection method is direct fast-neutron detection without the added moderation step. Direct detection should to a large extent greatly diminish or even eliminate the above-described problems. Basically two mechanisms for direct detection can be incorporated into a PPS-device based on the structure shown in FIG. 1.

In the first method for direct detection, a material layer/coating is employed containing an isotope such as $^6$Li, which can directly interact with fast-neutrons via an α-particle nuclear emission reaction. The emitted α-particle can then subsequently react within the conversion layer to generate free-electron (e) and/or gamma-ray emission, which in the case of the later can effectuate a tertiary reaction resulting in electron emission. Thus regardless of the particular mechanistic path, the $^6$Li (n,α) reaction can directly or indirectly (i.e., via a gamma-ray) lead to free-electron emission near the PPS gas interface, which in turn can result in a pixel avalanche detection/counting event.

In the second method, a material layer/coating is employed which can interact directly with fast-neutrons via the mechanism of elastic scattering by light nuclei (e.g., $^1$H) resulting in a recoil nucleus which in the case of $^1$H is a recoil proton. For single scattering from hydrogen, the incident neutron can transfer all of its energy to the recoil proton, although on average about one-half of the incident neutron energy will typically be transferred. Because of the proton charge, the recoil proton range will be relatively small, with secondary emissions occurring similar to those resulting from the previously described $^6$Li (n,α) reaction. From a materials compatibility point of view, $^6$LiH should prove to be an excellent choice for a PPS fast-neutron conversion layer coating, for the two individual isotopes (i.e., $^6$Li and $^1$H) are each ideally suited in terms of providing optimum response with respect to the two, direct, fast-neutron, detection mechanisms discussed above.

In terms of an embodiment of the invention based on FIG. 1 using a $^6$LiH first conversion layer 19, it is noted that LiH forms a stable compound and should be compatible next to a second conversion layer 20 of gadolinium, which is also capable of forming a hydride. The use of a Gd containing layer for neutron detection was previously discussed. In this regard, introduction of a thermal/anneal fabrication-process cycle to enhance interstitial diffusion of $^1$H (and also $^6$Li) from the outer LiH first conversion layer 19 to the inner Gd second conversion layer 20, should promote more efficient transfer of α-particles, recoil-protons, gamma-rays and free-electrons across the boundary between the two conversion layers and towards the gas detection region, thereby significantly increasing the efficiency of the PPS device as a direct fast-neutron detector. It is noted that this expected increase in efficiency from interstitial diffusion should in part be the result of reduced lattice mismatch (i.e. surface defect traps) between the two layers.

In addition to the use of 6LiH for the first conversion layer as discussed immediately above, other possible first conversion layer materials suitable for direct fast-neutron detection include: $^6$LiF which could form an inter-diffusion layer of stable gadolinium fluoride (i.e., GdF$_3$), and $^6$Li$_2$O which similarly could form an inter-diffusion layer of stable gadolinium oxide Gd$_2$O$_3$. In the latter case, a number of $^6$Li$_2$O-based glasses are commercially available and might be used instead of a pure $^6$Li$_2$O coating, although a pure $^6$Li$_2$O layer might offer higher efficiency performance and possibly lower overall cost. In summary, the embodiment of the fast-neutron detector structure as described above and shown in FIG. 1, utilizes a first conversion layer 19 that could be $^6$LiH (or $^6$LiF or $^6$Li$_2$O), and a second conversion layer 20 that could be Gd metal. The thin insulating dielectric layer 21 could be Gd$_2$O$_3$, which if thin enough could be partially conducting to facilitate the bleeding away of stored charge. In another embodiment, the second conversion layer 20 of Gd metal could be eliminated by going directly from the first conversion layer 19 to the insulating Gd$_2$O$_3$ layer 21. In either embodiment, the electrode structure 16 could be fabricated from a variety of metals, although Gd or a Gd alloy such as Gd—Ni would be obvious choices. In terms of the choice of substrates 12, the above embodiments can employ any of four categories of substrate materials: a non-reactive glass or metal substrate, a reactive $^6$Li-alloy metallic substrate, or a reactive $^6$Li$_2$O-based glass substrate. With regard to the structure and materials to be employed for the back plate in FIG. 1, the configuration and materials can mirror those chosen for the front plate as shown, or can utilize a back plate construction that eliminates one or both of the conversion layers 23, 24 and possibly the second dielectric layer 22 (if the second substrate is an insulator), or uses less exotic (i.e., expensive) materials than those employed on the front plate.

In terms of the two types of reactive substrates described immediately above (i.e. the $^6$Li-alloy metal and the $^6$Li$_2$O-based glass), the desired $^6$Li species can be introduced by means of either the "pure" isotope or by virtue of its 7.6% abundance in the naturally occurring element (note $^7$Li constitutes the remaining 92.4%). Two possible candidate metallic substrates include alloys of the Mg—Li and Al—Li systems. However, higher levels of lithium can probably be incorporated into glass substrates as compared to metal substrates. Among possible lithium containing, stable glass substrate systems are: borates, silicates, borosilicates, aluminosilicates, aluminoborosilicates, tungstates, etc.

As discussed above, by employing the method of direct fast-neutron detection, the incident particle energy distribution information can be preserved and used for purposes of source radioisotope identification. To accomplish this, a PPS front substrate configuration similar to that shown in FIG. 3 or 4 can be used in the manner previously discussed. Given this structure, a molded material such as the above-described $^6$Li containing metal or glass substrate might be the best choice for the grooved dual-level plateau, outer conversion plate. In either case, the dielectric layers 44 and 64 shown in FIGS. 3 and 4 should also function as a secondary conversion layer for the generation of free-electrons to the gas from α-particles emitted by the outer plate $^6$Li (n,α) reaction.

As previously disclosed, the SD-PPS structure as shown in FIG. 2 has the capability of employing large gas gaps without adversely affecting the local gas discharge pixel field. In taking advantage of this feature, one embodiment of the invention can employ $^3$He based gas mixtures as a detection media for fast-neutrons in either the SD-PPS structure 30 of FIG. 2, or the DSD-PPS variant of that structure as previously described.

Gas System & Priming

As previously discussed, to maximize sensitivity plasma panels for radiation detection should minimize all internal sources of priming electrons, and be configured such that the priming electrons needed to initiate the gas discharge are generated from an external source of ionizing radiation such as gamma-rays or neutrons. Therefore, in embodiments of the present invention, the gas mixture, discharge gap, pressure and drive voltages, in combination need to inhibit all internal sources of priming electrons, while at the same time maximizing sensitivity to radiation-induced, free-electrons. The design elements and methodology disclosed below are to inhibit unwanted priming, including minimizing gas phase metastables as well as the lifetimes of gaseous excited state species and propagation of VUV emitted photons (via use of appropriate gas-phase quenching and VUV absorbing molecules).

Penning Mixture—Addition of suitable, low ionization potential gaseous component(s) at low concentration (i.e., molecular species such as O$_2$ or NO, or gas phase atoms such as Hg) to depopulate excited state metastable species. The Penning mixture maintains high amplification and hence good avalanche initiation.

Discharge Spreading Inhibitor—Elimination of adjacent cell priming to maintain spatial integrity of the initial localized discharge site (for high image resolution), thereby preventing the discharge from spreading into neighboring cells. The method is based on reducing the mean free path of high mobility gaseous electrons or ions, by the addition of a small amount of gas having both a large electron capture cross-section and a high propensity to form negative ions. Fortuitously, O$_2$ is such a molecule which can also form a Penning mixture (see above) with xenon to depopulate excited state metastable species. In addition, O$_2$ will absorb VUV photons as well as "stray electrons", thereby further localizing the pixel discharge. In essence, the addition of O$_2$ (and possibly other species such as NO) demonstrates that the discharge can be controlled and suppressed enough to prevent it from spreading to adjacent cells, but not so much as to prevent localized (i.e., single pixel) avalanche amplification.

Gas Collisional Cross-Section and Discharge Voltage—Panel gas mixtures at maximum pressure and with maximum average atomic-weight can be used to increase the likelihood of electron capture/interaction and the probability of secondary electron generation. For example, the basic xenon-in-neon gas mixture used in commercial PDPs was successfully modified to increase electron collisional cross-sections by replacement of neon with higher atomic-weight gaseous components. As a side benefit, increasing the average atomic-weight can: (1) raise the voltage thereby increasing the local pixel field, (2) shorten the discharge time thus allowing faster response and higher update rates, and (3) reduce device dead-time.

"Typical" Gas Mixtures for Neutron Detectors—Neutron detectors such as the microstrip gas chamber (MSGC) typically use $^3$He or $^{10}$BF$_3$ as the neutron converter and CF$_4$ as the quencher. In a columnar-discharge PPS device such as shown in FIG. 1, there would be very little benefit to using $^3$He, because the panel operates at reduced pressure and has a small gap (i.e. path length ~0.1 mm). Additionally, helium has a very low electron collisional cross-section compared to other inert gases, and so in this sense would actually reduce device efficiency. Finally the use of $CF_4$ as a quencher would probably be extremely detrimental as both carbon and fluorine ions in a plasma discharge environment would be extremely active chemically and thus destructive of the electron emissive surface (i.e., top dielectric facing gas and electrodes). However, in a SD-PPS configuration as shown in FIG. 2 (or in a DSD-PPS), the use of $^3$He for both fast- and slow-neutron detection could be of significant benefit as the surface-discharge PPS structure can accommodate much larger gas gaps.

Oxygen as "Penning" Charge-Transfer Dopant & Avalanche Control Agent—The visible emission spectra from two lighted, AC-PDPs (i.e., undergoing discharge), filled with 100% Xe, and 99% Xe/1% $O_2$, have been recorded and analyzed. In the 100% Xe panel, the typical xenon "blue" emission lines from Xe—I were observed with the two strongest lines in the xenon visible region readily apparent at 467 and 462 nm. However, in the 1% $O_2$ mixture, even though the gas mixture still contains 99% xenon, the prominent "blue" Xe—I lines were "missing", but the strong "green" lines from 533 nm to 558 nm of ionized atomic oxygen were present and dominated the visible spectrum. The first ionization constants for molecular oxygen and atomic xenon are respectively at 12.07 and 12.13 eV. Thus molecular oxygen and atomic xenon are coincidentally almost in perfect resonance, with the ionization energy of $O_2$ being just below that of Xe, making $O_2$ an excellent component for transferring the charge from ionized Xe to $O_2$. The fact that the emission spectrum of the 99% Xe/1% $O_2$ gas mixture has the characteristic "green" color of oxygen, without any of the "blue" bands of xenon, shows that excited Xe efficiently transfers its energy to molecular oxygen, which upon dissociation (in an active plasma) emits from its lower energy levels centered around the 538 nm peak that characterizes atomic oxygen. Thus a small amount of $O_2$ can quench ionized Xe and excited Xe metastables, and thereby confine the PPS discharge to the local pixel site closest to where the initial conversion event of an ionizing photon or neutron to a free-electron takes place. The fact that $O_2$ is also a good VUV absorber and scavenger of "stray" electron charge, simply adds to its effectiveness as both a discharge spreading inhibitor and avalanche control agent.

Device Structure

A PPS detector in accordance with an embodiment of the present invention, however configured, needs to be hermetically sealed, gas processed and generally fabricated in a manner similar to PDP devices. Yet unlike commercial PDP devices, PPS radiation detectors need to avoid internal 3-dimensional dielectric surfaces (e.g., phosphors, etc.) to minimize pixel wall charge. As discussed above, for maximum device efficiency the PPS structure should be designed with a slight amount of internal dielectric conductivity to be able to "bleed off" residual wall charge left on the internal dielectric surface at and adjacent to the site of cell discharge at the gas-electrode interface.

Depending upon electrode pitch, the PPS in accordance with embodiments of the present invention is a highly integrated array of between ~$10^2$ to $10^6$ micro-detection cells per square inch, each of which has the capability of acting as an independent, position and intensity sensitive, radiation sensor. From a materials, fabrication, and theoretical viewpoint, "an ultrahigh" PPS pixel resolution of ~0.01 mm is eminently feasible, much more so than for a commercial television PDP product. This is because the most likely PPS configurations (e.g., FIGS. 1-4) all resemble DC-PDPs, as opposed to the AC-PDP structures used in essentially 100% of all commercial PDP-TV products. From a fabrication viewpoint, the electrode resolution in a DC-PDP can be much higher and much better controlled than in an AC-PDP device, because DC-PDP electrodes are not encapsulated under a highly reactive and chemically corrosive thick-film dielectric, which tends to undercut and undermine the AC-PDP electrode-material linewidth. As an important collateral benefit, minimizing the PPS electrode-width for purposes of enhancing image resolution, should also raise the intrinsic firing voltage, thereby increasing the local-pixel, electric-field strength, and hence the device sensitivity.

Gamma-Ray to Free-Electron Conversion Plate/Layer—In order to achieve efficient gamma-ray to free-electron conversion, high density, high-Z materials should be used having: (1) a high material attenuation coefficient with respect to the incident photon radiation, (2) high electron emissivity within the conversion media (i.e., high electron-fraction associated with photoelectron and Compton-recoil-electron emission), (3) efficient electron transport through the conversion media to the gas interface, and (4) a low surface work-function with regard to electron ejection out of the conversion media and into the gas. Depending upon the spectral region, the choice of conversion media can include both high-Z metals (see below) and/or high-Z dielectrics. Examples of the latter include dielectrics incorporating such "heavy" components as $WO_2$, $HfO_2$, $PbWO_4$, $Bi_2(WO_4)_3$, PbO, $Bi_2O_3$, $Ta_2O_5$, $Gd_2O_3$, etc.

High-Z, Dual-Function, Front Substrate/Conversion Plate—At high photon energies, certain high-Z materials could in principle improve PPS device efficiency by serving the combined role as both front substrate and conversion plate, thereby eliminating for such an embodiment the first and second conversion layers 19, 20 in FIG. 1. For such configurations, "workable" tungsten alloys (e.g., W—Ti, W—Zr, W—Ta, W—Re, W—Pt etc.) that could be conveniently cast or formed into multi-level structures, such as those shown in FIGS. 3 and 4, are good candidates along with other high-Z metals, such as Ag—Cu, Pt—Ag, Pt—W, etc., which are highly electron emissive. With these materials, an appropriate thin-film oxide deposited on the substrate bottom surface for electrode isolation would serve as a dielectric layer 21. Any of the standard electron beam or sputtered thin-film insulating oxides should work, assuming a good match between the linear coefficients of thermal expansion. Materials such as $WO_2$, $HfO_2$, $La_2O_3$, $Gd_2O_3$, $Bi_2O_3$, etc., and combinations thereof (e.g., $La_2O_3$—$Gd_2O_3$), need to be investigated because of their combination of high-Z number and low work-function for secondary-electron emission. Candidate metals for the electrodes 16 should have high electron emissivity, and so silver, tungsten, and nickel are possible choices, perhaps flash-coated or alloyed with platinum for greater electron emissivity and resistance to sputtering. From a materials compatibility point of view, an interesting combination for the substrate 12, 14/dielectric 21, 22/electrode 16, 17 system embodiment might be: W-alloy/$WO_2$/W—Pt, other systems include: Gd-alloy/$Gd_2O_3$/Gd—Ni, Ta-alloy/$Ta_2O_5$/Ta—W, etc.

Partially Conductive Dielectric Layer—Use of a partially conductive dielectric layer positioned between the device electrodes and a conductive conversion layer in the various embodiments for FIGS. 1-4 can make for an efficient PPS configuration because it provides a means to bleed away accumulated wall charge from the top insulating dielectric layer that is in direct contact with the discharge gas. Three means of fabricating such a partially conductive dielectric include: (1) selection of an appropriate dielectric material that is inherently slightly conductive, (2) fabricating a partially conductive dielectric by virtue of adding high mobility dopants such as lithium (e.g., in the form of $Li_2O$) or boron (which can be a semiconductor), (3) utilizing a very thin dielectric film that is partially conducting by virtue of its extremely thin cross-section.

Pixel Response to Incident Radiation Flux (Intensity)—The disclosed embodiments of the PPS are for a true digital integrating device. The light intensity of an individual lit pixel is not particularly important, only the fact that a pixel is either lit or unlit (i.e. "on" or "off"). The intensity integration is therefore based on the number of times that a particular pixel goes "on" in a fixed period. With the possibility of a pixel lighting as many as 1,000,000 times per second (see below), the image gray scale capability of a PPS detector is most impressive and should be far better than for a PDP video monitor which can display 256 shades of gray in 1/60 sec, or equivalently turn "on" 15,360 times per second. Besides individual and collective pixel intensity data, additional integration information to be collected by the PPS module electronics would include the location of each pixel that goes "on". For the described PPS device, the photon gain should be even better defined in terms of uniformity than in a PDP video monitor, because the internal plasma panel structure is planar (i.e., very easy to fabricate) as opposed to three-dimensional (i.e., PDP devices require hard-to-control, three-dimensional, process fabrication steps such as the sintering and sandblasting of vertical barrier walls, and the thick film deposition of phosphor into a three-dimensional barrier structure). Given a pixel response rate potential of $10^6$ counts/sec (cps), and a potential pixel resolution of 10 µm corresponding to an image dot density of $6 \times 10^6$ pixels/square inch, yields a PPS detector response capability of $6 \times 10^{12}$ cps per square inch. This response capability is far in excess of anything that might be experimentally encountered, so signal saturation should not be an issue and PPS devices should thus be capable of providing linear digital intensity responses to essentially any source of incident radiation.

Photon Induced Charge Generation & Propagation—The mechanism of charge generation within the PPS depends upon the energy of the incident photons and the material composition of the conversion layer (i.e., Z-number). For photon energies below about 200 keV, the device charge will be generated primarily by photoelectric absorption of the incident photon resulting mostly in K-shell electron emissions, with some secondary X-ray photon and Auger electron emission. For higher energy incident photons (e.g., above 500 keV), the charge will be generated primarily by Compton scattering, resulting in creation of a successive number of recoil electrons. In terms of transport to the gaseous volume, since any incident photons (and neutrons, etc.) will, by definition, have their momentum vector facing the forward direction, the resulting generated electrons will by conservation of momentum be statistically favored to be emitted in the direction of the gas (i.e., the forward direction). This statistically favored probability factor should be further enhanced by the generated free-electrons feeling the "pull" of the pixel EMF field emanating from the interface or junction of the surface electrode and gaseous layer. For these reasons, the most critical or important conversion plate/layer should be on the front substrate.

Integration of PPS Device Collimator—As with any detector, in order to realize the high-resolution imaging potential of the PPS-device, it is necessary to couple it to a collimator. Generally, the cost of the collimator should be independent of the radiation sensor, and so it should make no difference with respect to the collimator whether the radiation sensor is based on PPS, a-Si, photomultiplier, CMOS or CCD technology. However, in terms of cost, the PPS could have a unique and significant advantage. This is because the physical features and material requirements of a high-resolution collimator could be similar to those for the high-resolution, dual-level plateau, substrate plate (see FIGS. 3 & 4). On a materials basis, both the collimator plate and dual-level substrate plate could be fabricated out of the same metal (e.g. a "workable" tungsten alloy as described above). Thus the "dual-level, micro-segmented plateau" could possibly be designed to also function as a collimator, allowing for shared material cost and auto-alignment.

PPS Image Output—In terms of collecting the image location information/output data for activated PPS pixels, two basic methods are available. Since plasma panels are conventionally made of glass and are optically transparent so as to see the lit pixels (e.g., TV image), an inexpensive CMOS (or CCD) camera (or flat array of such cameras) could be located at the back of the plasma panel to record the location of each pixel discharge event (see FIG. 6). The camera(s) to be used could be low-cost, wide-angle versions of the tiny cameras being integrated into mobile phones. One such embodiment would consist of a "flat" array of integrated CMOS cameras physically positioned as an intermediate layer between the PPS sensor head and the back-plane module electronics (note that the PPS sensor head is defined as the "bare" plasma panel including any dual-level conversion plate). In an alternative embodiment the module electronics would be placed along the outside perimeter of the PPS sensor head. If a camera-based data collection method is employed, then the PPS back substrate and any associated conversion layers and dielectric layer would also have to be transparent, which is not a problem. The second and lower cost, preferred method for collecting image location/output data, is direct electronic detection. In this embodiment, the detection event circuitry is designed to not only count the number of detection events, but also to integrate the number of events per unit time and to record their spatial location in order to generate an image of the radiating source. Since each row and column of the PPS device has a current-limiting impedance (e.g., typically a resistor) to prevent run-away discharges, the location of each discharge event can be determined by measuring the row-column voltage drop. This latter method requires careful avalanche control (i.e., impedance matching) and fast response times (i.e., rapid elimination of pixel wall charge) to prevent data-loss due to PPS device dead-time. It is noted that instead of using an external row and column impedance, an internal impedance element (e.g., resistor) could be screen-printed into each pixel to reduce row/column discharge dead-time and so allow each pixel to be electronically independent of the discharge state of other pixels on the same electrode. A fabrication process for screen-printing a high impedance, series resistor into the circuit of each discharge cell (i.e., pixel) was developed and employed in the early 1990's by several Japanese companies pursuing color-DC-PDP technology for HDTV applications.

Avalanche Control & Response Time—An electron avalanche (i.e., plasma discharge) has features that need to be controlled: initiation, duration, reset and discharge spreading. Essentially the entire plasma panel material structure hierarchy, and electronics reactive circuitry (including power supply design), contribute to the above discharge avalanche characteristics. The specific control parameters include: gas mixture composition and pressure, discharge gap, electrode width and pitch, dielectric constant(s), dielectric cross-sectional thicknesses, dielectric surface and volume resistivity, discharge cell internal impedance, panel electrode row and column internal impedance, external reactive circuit impedance including power supply, etc. Since minimization of wall charge, along with spreading avalanches and pixel discharge resetting, can be problematic with AC-PDP's but not with DC-PDP's, the PPS configurations shown in FIGS. 1-4 are primarily focused on DC-PDP operation. The two critical metrics required to meet the goals for avalanche control and fast response time are: (i) limit the discharge spreading to the spatial resolution of "one cell", and (ii) limit the cumulative time period of the three avalanche phases (i.e., initiation, duration and reset) to about 1 microsecond (μs) which was the time period observed for some of the first modified-PDP radiation sensing devices evaluated. It is noted that the avalanche initiation and duration phases were typically observed to occur within a few hundred nanoseconds for the modified 1.0 mm electrode pitch PDP devices studied. However, using a higher resolution panel (e.g. 0.01 to 0.1 mm electrode pitch), with a shorter discharge gap, and higher voltage, should lead to a significant reduction of the three avalanche phases to well below 1 μs. Yet, even with a 1 μs pixel response time, each pixel should be capable of recording 1,000,000 counts/sec. Since the pixels in a PPS should operate independently and in parallel, a 10 μm electrode pitch panel should be capable of recording $6 \times 10^{12}$ counts per second per sq. inch.

Buffer Circuit, Impedance, Data Capture & Noise—In-line impedance is a factor in the initiation, duration and reset phases of an avalanche. Buffer circuitry can prevent feedback of an avalanche across one set of opposing electrodes from coupling into other sets of electrodes. A buffer circuit can incorporate in-line impedance and/or discharge-event sensing. It can also provide gating or synchronization of the power supply output to an electrode. It is noted that the power supply needs to be under control of the discharge-event signal processing system. The use of buffer circuits, with in-line impedance control, is highly interrelated with the power supply, gas mixture and electrode systems. These systems must integrally support the initial surge (initiation), and sustain it long enough (duration) to sense a discharge-event, but not so long as to enable discharge spreading, or electrode deterioration. The reset phase is for dissipation of gaseous excited state species, space/surface charges (internal priming), and re-synchronized electronics. The initiation, duration and reset of a discharge-event occurs on the order of ~1 μs or less. Thus, capturing and updating/refreshing the PPS image over the module active area at a frame rate of 1 ms (i.e. 1000 fps) should be straight-forward, with frame rates corresponding to 0.1 ms (i.e. 100 μs or 10,000 fps) being possible.

FIG. 5 illustrates a micro-sensor circuit 52, which is described in more detail below. The cross-point within the square receiving a "free-electron" and showing a discharge event (DE) is at the intersection of two opposing electrodes separated by a gap that is filled with the discharge gas. A power supply (the rectangle with "+" label) is connected through a buffer circuit to an in-line impedance (the cylinder) to one electrode. Across the impedance is connected a circuit to sense voltage drop or current flow in the impedance. The other electrode is connected to a similar circuit that "returns" to ground. For notational purposes, a DE sensed in an X-electrode can be referred to as DEX, and a DE sensed in the Y-electrode can be referred to as DEY. The "cell" is registered where the DE occurs when DEX and DEY are sensed simultaneously, and can be referred to as a DEXY. Thus, a DEXY is equivalent to a matrix display's "pixel".

Discharge Event Image Processing—The outputs of the DEX and DEY sensors are connected to synchronizing circuits (i.e., "DEXY-Former") that essentially time-stamp each event referenced to a master clock. The DEXY-Former provides information to a "Sensitivity Control" circuit that in turn provides control to the power supply and the DEX and DEY sensors. Thus, the DE processing system is a closely linked, if not closed loop, system that requires very coordinated integration with both individual PPS modules and the global PPS tiled module array system. The DE processing system also feeds a stream of sequential DEXY frames or "pictures" through a "Link" to a "Sensor Compiler" (57 in FIG. 5). The DEXY frames or pictures represent the most basic imaging function of the PPS. DEXY frames can be compiled into segments in the time domain indicating intensity of radiation by showing DE spatial and temporal density. With appropriate collimators applied to the segmented dual-level modular array, high resolution source imaging and radioisotope identification of the incident radiation source can be achieved. The radioisotope ID fingerprinting can be further enhanced by programmed voltage adjustments at the DE processing level, and system level algorithms in the "Sensor Compiler" and "Detector Processor" (58 in FIG. 5).

Discharge Event Camera Augmentation—As previously discussed, the PPS "back" or "second" substrate can be transparent to provide the option of optically capturing the DEXYs. Camera requirements, including: resolution, lens, angle of view, focus, shutter/frame speed, CMOS/CCD sensitivity, mounting, etc., need to be evaluated relative to integrating the camera array back-plane with DE processing and optimization, including camera synchronization with associated panel electronics and subsequent Sensor Compiling and Detector Processing. In particular, camera augmentation still requires some form of electronic cell (i.e., DE) sensing to be performed to trigger or synchronize the camera functions.

Signal-to-Noise Ratio—The projected signal-to-noise (S/N) ratio for the PPS should be extremely high, as the plasma panel itself does not employ any low voltage, semiconductor, material structures such as transistors, or any other materials having significant temperature performance dependence. Since there are no low voltage bandgap materials present that could be thermally populated, there is no reason to employ any cryogenics or any other type of active device cooling. It is therefore not likely that a pixel could be thermally induced to light up, although the possibility exists that under thermal stimulation an inert gaseous atom could collide with the dielectric surface and cause an electron charge to transfer to the gas as a free-electron and thereby initiate a pixel discharge. In general PDP devices are considered to have the widest operating temperature range of any display device known and are normally limited not by the plasma panel, but by the thermal range of the external electronic circuitry. However the S/N ratio, with regard to resolving energy emission lines for purposes of radioisotope identification, can always be improved upon by signal enhancement via the use of larger PPS array collection areas.

Detection Event Circuitry

Figure 7:
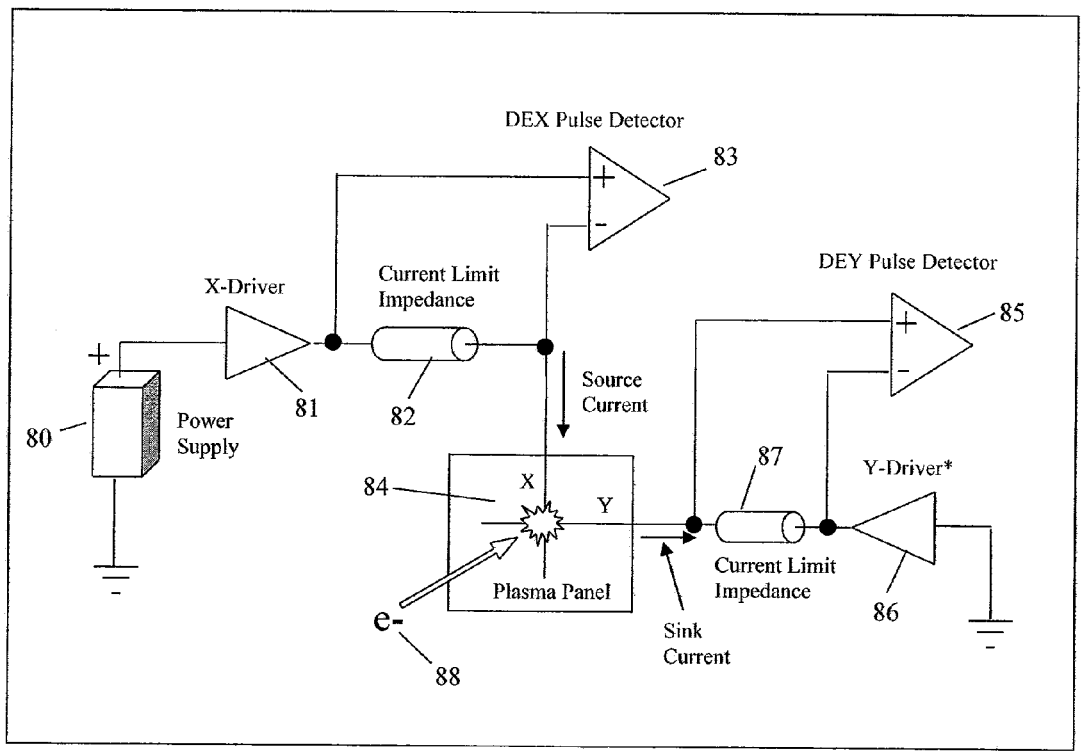
FIG. 7 is a block diagram illustrating the circuitry attached to two current-directional electrodes (X and Y) defining a pixel centroid of a plasma panel radiation sensor in accordance with one embodiment of the present invention for electrically sensing a discharge site.

One embodiment of detection event circuitry that can function as circuitry 52 shown in FIG. 5 and that detects discharge events is shown in FIG. 7. FIG. 7 is a block diagram illustrating the circuitry attached to two current-directional electrodes (X and Y) defining a pixel centroid 84 of a PPS in accordance with one embodiment of the present invention for electrically sensing a discharge site. The circuitry attached to the X-axis of the plasma panel includes a power supply 80, an X-Driver 81, a current limit impedance 82 and a DEX pulse detector 83. The circuitry attached to the Y-axis of the plasma panel includes a Y-Driver 86, a current limit impedance 87 and a DEY pulse detector 85. In either or both axes the current limiting impedances can be implemented as resistances and/or reactances. In one embodiment, the drivers, impedances and pulse detectors of FIG. 7 may be active or passive elements, and may in some combinations be provided by integrated circuits. Further, in one embodiment, X-Driver 81 and Y-Driver 85 are not included on an individual electrode basis as is common in commercial PDP video display applications.

The sensing shown in FIG. 7 is initiated through a gamma-ray (or ionizing particle) interaction in a PPS conversion layer, generating a free-electron 88 ejected out of the PPS surface interfacing the gas, and into the high E-field defining the pixel space 84 as previously described. The mechanism can also be expressed in chronological terms relative to an avalanche or discharge event ("DE")—i.e., before, during or after the avalanche. It is also useful to be able to quantify the sensing ability of the DE in physical terms. In this regard a "bare" plasma panel reference, known as the "discharge margin" ("DM") voltage, is useful for improving the plasma panel sensitivity. The DM voltage correlates to the detection distance sensitivity of the PP-sensor. Specifically, the larger the DM voltage, the greater the apparent sensitivity (or detection distance) of the PP-device with respect to a given radioactive source. The discharge and/or recovery speed (in microseconds), the manufacturing cost, and the collection efficacy are other factors relevant to optimizing embodiments of the present invention.

Figure 8:
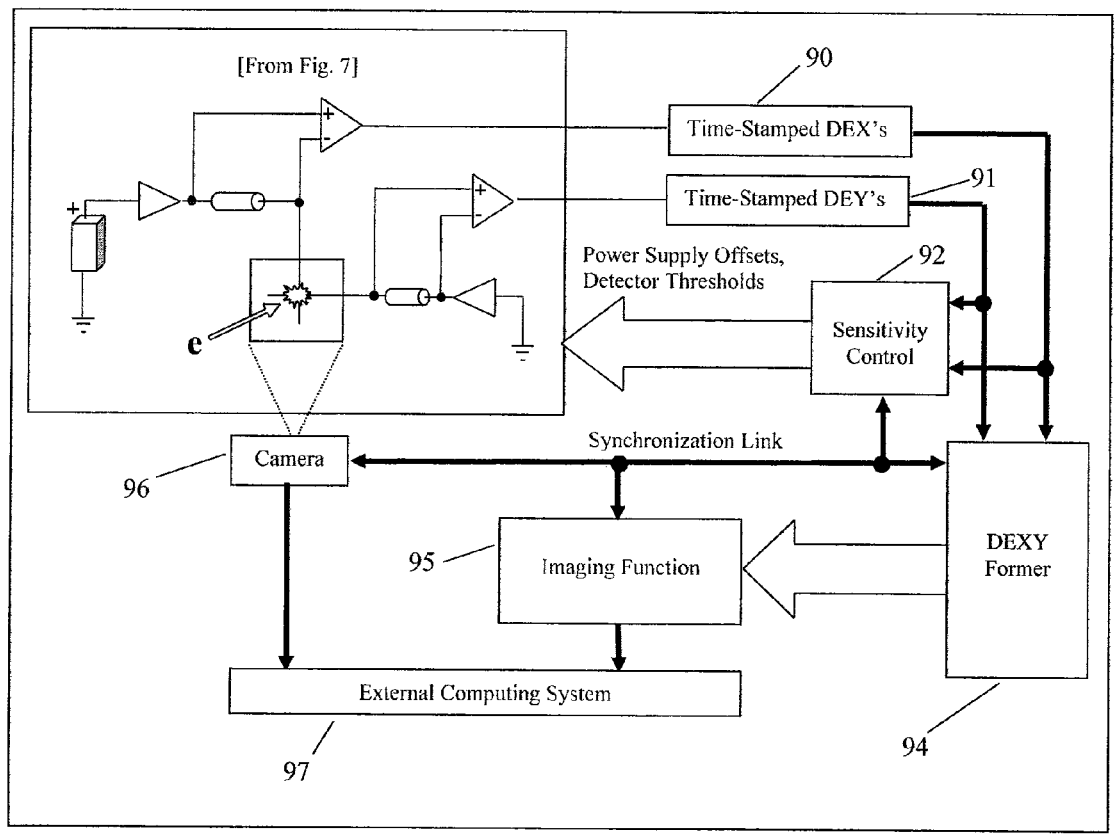
FIG. 8 is a block diagram illustrating detection event processing circuitry that is attached to the circuitry of FIG. 7 in accordance with one embodiment of the present invention.

FIG. 8 is a block diagram illustrating detection event processing circuitry that is attached to the circuitry of FIG. 7 in accordance to an embodiment of the present invention. The detection event processing circuitry, discussed in more detail below, includes time-stamped DEX's 90 and time-stamped DEY's 91, sensitivity control 92, DEXY former 94, imaging function 95, camera 96, and an external computing system 97.

In one embodiment, the electronic sensing and detecting circuitry shown in FIGS. 7 and 8 are involved before, during, and after an avalanche. Power supply 80 biases the electrical sensing mechanisms before the avalanche. The detection electronics (e.g., DEX pulse detector 83, and DEY pulse detector 85) provide the sensing mechanism during an avalanche. The DE processing circuitry (e.g., DEX's 90, DEY's 91, sensitivity control 92, DEXY former 94, imaging function 95, camera 96, and external computing system 97) provides the after-avalanche sensing mechanism.

Power supply 80 in one embodiment is the power supply to the plasma panel and has one output connected to the X-electrode(s) on one side of a DC plasma panel. In an embodiment having an AC plasma panel, there is at least one "X" output and one "Y" output from power supply 80. In one embodiment, power supply 80 can be implemented as multiples of the same circuit with their separate outputs going to individual electrodes or groups of electrodes. In one embodiment, power supply 80 is adjustable, under control of the DE processing system described below.

As discussed, a DE equals a gamma-ray (or ionizing particle) sensing event, therefore the following notation may be used in describing embodiments of the present invention:

DE=discharge event=gamma-ray sensed
DEX=DE sensed in the X-axis (i.e., output column electrode) of the plasma panel
DEY=DE sensed in the Y-axis (i.e., output row electrode) of the plasma panel
DEXY=DE sensed at a X-Y pixel location of the plasma panel As described, in embodiments of the present invention, a DE is self-limiting by virtue of an opposing impedance that cuts off the discharge before a run-away current develops that could vaporize the electrode(s). The "opposing impedance" in one embodiment is impedance 82 and impedance 87 of FIG. 7, which can be resistive in the case of a DC plasma panel. Whenever a DE occurs, the current flowing through the electrodes and their associated impedances causes a voltage drop across the impedance which terminates the discharge. The momentary voltage drop across the impedances in the current path of the DE is sensed by DEX and DEY pulse detectors 83 and 85 shown in FIG. 7.

As shown in FIG. 8, the outputs of DEX and DEY pulse detectors 83 and 85 are coupled to synchronizing circuits that time-stamp each event referenced to a master clock. Therefore, DEX and DEY events with the same time-stamp are combined to define and store DEXY's in a DEXY former 94 circuit. DEXY former 94 provides information to sensitivity control 92 circuit that provides feedback information to power supply 80 and DEX and DEY pulse detectors 83 and 85. Feedback control may be implemented for real-time impedance adjustment and optimization. The DE processing system is a closely linked system requiring coordinated design optimization involving the X and Y impedances, power supply (whether AC or DC), drive waveforms, pulse detectors, and almost every aspect of the plasma panel's configuration and materials selection. The DE circuitry processing system in accordance with embodiments of the present invention also feeds a stream of sequential DEXY frames or "pictures" to imaging function 95. Because the master clock should be capable of running at a speed high enough to catch DE's sometimes occurring continuously, simultaneously and back-to-back, large amounts of raw data could be generated such that the data might need to be appropriately filtered and/or compressed using known processing methods. In one embodiment, standard commercial gate arrays, memory chips and other IC components are implemented to meet the DE processing requirements.

In one embodiment, camera 96 is included in the DE processing to perform various functions. First, if one side of the plasma panel has optically clear discharge sites, camera 96 may be used to directly capture DEXY's. Camera 96 is synchronized to sensitivity control 92, DEXY former 94 and imaging function 95. In another embodiment, a second camera function may be used to capture photodiode (i.e., LED) blinks from current in the electrode paths. In this embodiment, the photodiodes transform discharge current to light pulses that the camera would capture as DEX and DEY "pictures", which would further be synchronized and processed in DEXY former 94 and imaging function 95.

As shown in FIG. 8, in one embodiment the DE processing system feeds a stream of sequential DEXY frames or "pictures" from DEXY former 94 to imaging function 95. In one embodiment the DEXY frames are translated into a protocol and transport scheme that can be readily connected and processed by external computer system 97 using known processing techniques. A bi-directional bus or network function is represented by the 4-point arrow structure indicated as the "Synchronization Link" in FIG. 8.

The Stacked PPS Apparatus

Figure 9:
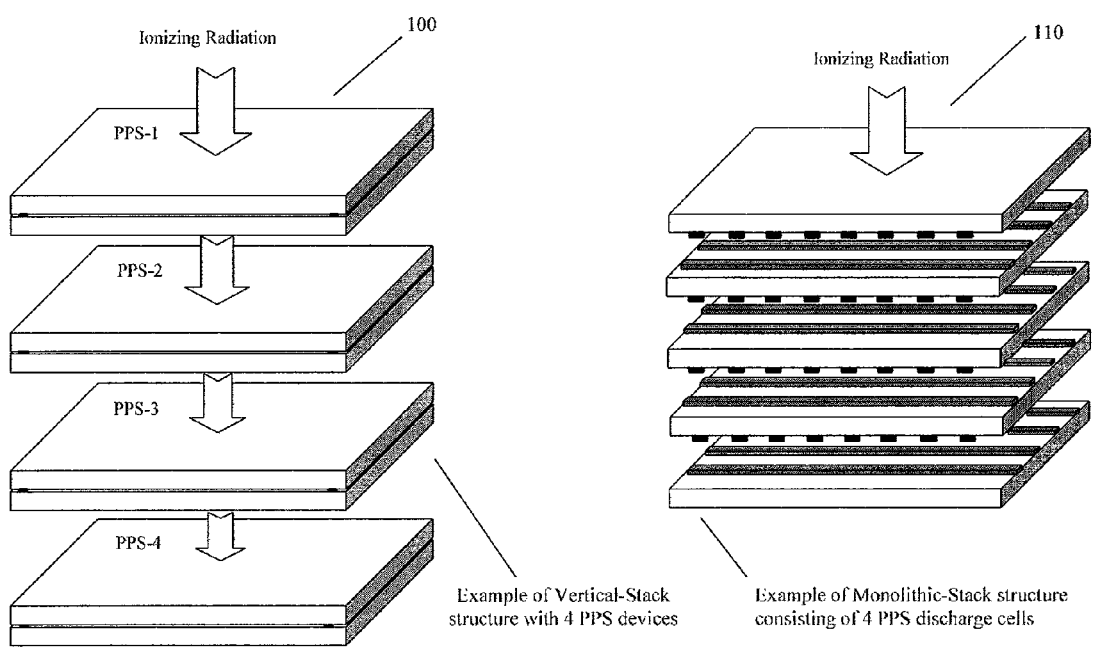
FIG. 9 is a perspective view of two vertically-stacked plasma panel radiation sensor configurations in accordance with two embodiments of the present invention.

A critical figure of merit for a great many material items is the intrinsic device efficiency, although as discussed above, the system or global efficiency is usually the more relevant parameter. Optimization of the basic PPS-device depends in large part upon optimization of the conversion plate/layer, as previously discussed. For example, the thicker the conversion layer, the greater the amount of radiation absorption (which is good), but the shorter the free-electron transport range (i.e., the lower the probability of the generated free-electron reaching the gas, which is bad). Whatever the optimum balance may be for a particular application, there will always be a compromise between absorption and electron transport, because these two functions move in opposite directions. However, the efficiency bar can be raised significantly by invoking a system design embodiment that in essence amounts to a paradigm shift. Namely, the PPS-device, because of its thin, flat panel structure, allows a vertical-stacking of one PPS-device on top of the other, which provides the system designer with a new degree of freedom. As a result, the PPS-device conversion plate optimization balance shifts towards using individually thinner conversion layers (i.e., less absorption), with each plate/layer having improved electron transport, and making up for the reduced absorption by vertically stacking more devices on top of each other. FIG. 9 is a perspective view of a vertically-stacked PPS configuration 100. This solution is readily affordable since each PPS-device is individually very low in cost. Additionally, this vertical-stack concept applies to all of the PPS structures previously discussed, including: incident photon and neutron PPS-detectors, AC and DC structures, columnar-discharge and surface-discharge configurations, etc. Finally, for most properties, the extra degree of freedom associated with vertical stacking, also allows for a variety of innovative hybrid structures, such as: having different spectral response optimized devices on top of each other, or different dual-level plateau structures on top of each other, or stacking of different pixel resolution devices, or mixing of columnar-discharge with surface discharge devices, or gamma-ray detectors with neutron detectors, etc. Further, FIG. 9 is a perspective view of another embodiment of the present invention of a monolithically-stacked PPS configuration 110 in which the vertical-stack is monolithic with the back substrate of the first device, serving as the front substrate of the second device, and so forth, etc.

Additional Details of Embodiments of the Present Invention

Embodiments of the present invention discussed above and below are configured for efficient, low-cost detection of ionizing photon and particle radiation, with a particular emphasis on security applications such as detecting radioactive materials hidden in a moving platform (e.g., FIGS. 5 and 6). The embodiment shown in FIG. 1 is probably the most universal in terms of variety of applications and the lowest cost in terms of fabrication. For maximum device efficiency, the two stacked PPS configurations shown in FIG. 9 should offer the highest performance, whereas for radioisotope identification the embodiments shown in FIGS. 3 and 4 should provide the greatest selectivity in terms of spectral resolution. However, in terms of overall system design, the tiled PPS-array arrangement shown in FIG. 5 offers the greatest level of flexibility, capability and system value.

With regard to the device operating voltage, in designing a plasma panel to function as a PPS radiation detector in accordance with embodiments of the present invention, the applied voltage across the discharge electrodes should be set at or above the so-called normal display firing voltage, as there should essentially be no background priming electrons within the gas gap volume comprising the panel active area. By maintaining the discharge electrodes at a well-regulated DC potential above the so-called normal display firing voltage, each pixel should be able to react almost instantaneously in generating a localized discharge event (i.e., avalanche) upon the occurrence of a radiation-generated, free-electron entering the panel gas-discharge space. However, the elimination of internal priming electrons (so as to raise the device operating voltage above the "normal" display firing voltage), essentially requires that internal wall charge be eliminated or at least minimized to a very low level. This is probably the single most important design consideration with respect to the various invention embodiments and to maximizing overall PPS performance as a radiation sensing device. All of the plasma panel sensor head embodiments disclosed herein (i.e., FIGS. 1-4) achieve this goal by first eliminating dielectric material residing above the electrode surface, and then introducing various methods to "bleed" off any remaining charge stored on the dielectric layer immediately in contact with and physically supporting the surface electrodes, by making this under-layer ever so slightly conductive and in direct contact with an appropriately biased conductor that can quickly and efficiently drain off any residual charge.

In terms of practical construction of the various disclosed embodiments, there is a huge volume of publicly available information relating to plasma panel fabrication. Without limiting the Invention, a few of the more basic aspects associated with PPS materials selection, device configuration, process fabrication and performance optimization are provided below.

First (Front) Substrate: This is the input side of the plasma panel where incident radiation enters. This substrate can be of glass or metal material, or a glass-metal laminate such as a thin metal sheet or foil on the inside surface supported by a thicker glass substrate on the outside, or even a metal-metal laminate. The top or outside surface facing the incident radiation source can be smooth or patterned. In the latter case, the pattern could be a 3-dimensional structure such as the grooved-rib pattern shown in FIGS. 3 and 4. If a patterned top surface is employed, the patterning can be accomplished by any suitable process including: casting, pressing, etching, machining, etc. The bottom or inside surface facing the discharge electrodes and gas should generally be as smooth as possible so that uniform voltage characteristics can be achieved for each discharge cell. However, for the surface-discharge configuration (SD-PPS), there may be a benefit to the ribbed structure being on the inside facing the gas. If the substrate is made of glass, the two most likely materials are 2.8 mm (thickness) Asahi PD200 which is a glass developed for plasma displays, and 0.5 mm Corning Eagle 2000 which is a low-Z, low-density, boro-aluminosilicate glass developed for liquid crystal displays. Commercial display glass substrates, however, continue to be reduced in thickness and this may hold advantages for certain applications. Of the two above products, the one with the widest temperature range and highest transparency to low-energy ionizing photons, such as 20 keV gamma-rays, is the 0.5 mm Corning Eagle 2000, and so this would be the preferred substrate for a PPS with maximum sensitivity to low-energy radiation. For mid-range energy photons the choice might be PD200 glass; whereas for high-energy ionizing photons, such as 2 MeV gamma-rays, the substrate choice might be a tungsten metal alloy. For slow-neutron detection, the preferred substrate might be a gadolinium metal alloy. In general, to maximize the transmission through the front substrate and minimize mechanical strain, the front and back substrates would benefit by being of identical material composition and thickness, and fabricated from the thinnest material commercially available and suitable for flat panel processing.

Second (Back) Substrate: This is the output side of the plasma panel where the incident radiation not attenuated by the PPS will exit. In a vertically-stacked module configuration, such as stack 100 of FIG. 9, the back substrate of the top PPS, faces the front substrate of the next lower PPS. However in a monolithic-stacked structure, such as structure 110 of FIG. 9, the back substrate of the top PPS, also serves as the front substrate of the next lower PPS, and so use of a glass substrate allows for simplified electrical separation in such monolithic devices since glass is an insulator. Generally the back substrate should be of identical material composition as the front substrate, but if not, it should have a similar linear coefficient of thermal expansion to avoid undue thermal stress and device warping. Unlike the front substrate, there is no need for the bottom/rear side of the back substrate to have a patterned structure.

Conversion Layers/Plates: One feature of the present invention is the use of an optimized conversion layer(s)/plate for converting incident ionizing photon (e.g., gamma-ray) and/or particle (e.g., slow-neutrons and fast-neutrons) radiation into free-electrons that can successfully propagate through the PPS structure to reach the gas volume and initiate a localized pixel avalanche that can be spatially detected, digitally counted, imaged, and spectroscopically analyzed. Numerous conversion layer(s) configurations, options, structures, geometries and materials have been described herein for various radiation detection applications (see FIGS. 1-4), and discussed in terms of specific optimization strategies for both individual PPS devices as well as overall system design (see FIGS. 5 and 9).

Electrode Circuitry: To enhance uniform voltage pixel characteristics, the electrodes should generally be as smooth and uniform as possible, which favors fabrication by thin-film processes such as sputtering. The actual construction method is not pertinent, and terms like X- or Y-electrodes, and column- or row-electrodes, are arbitrary and not to be limiting to the Invention. For example, the X- and Y-electrodes could be reversed in orientation and direction in FIGS. 1-4, and the structures in FIGS. 1 and 2 can be flipped as well, so that the bottom substrate is on top and vice versa. For FIGS. 1-4, the electrode drive circuit may be as simple as a well-regulated, stable DC (or AC) voltage source across the X- and Y-electrodes through as little as one resistor. However, in order to achieve high performance, most applications will likely impose additional considerations for the electronic circuitry as disclosed below. For example in FIG. 2 the X- and Y-electrodes are paired together in close proximity so that the discharge can be localized. In FIGS. 1-4, current will flow in both electrodes into the drive circuits, which may also serve as current (or voltage drop across impedance) sensors. Therefore, the XY "location" of the initial discharge can be determined most easily if each electrode has its own drive circuit.

The aforementioned resistor or reactive impedance limits the current flow during an avalanche and effectively controls the avalanche parameters, which are a function of the resistance (or impedance) together with other panel parameters such as the gas and electrode material and geometry. Electrodes may need to be patterned into groups that are electrically isolated and driven by separate resistors (or impedances) to achieve the avalanche characteristics desired. Alternatively, it may be that each electrode needs to have a resistor or other impedance for properly controlled avalanches. In fact, each individual discharge cell could have its own resistor or impedance to provide current sensing that can be processed per circuitry 52 of FIG. 5.

As previously discussed, insulating surfaces interfacing the gas may attract and store charge that inhibits plasma panel device sensitivity and response to incident ionizing radiation. Any spacers (or spacer-barriers) employed or dielectric layers may be implemented as partially conductive structures that need to have a bias voltage applied. A bias voltage may be applied on a timing basis, synchronized to be applied just after an avalanche is detected to remove charge along the barrier.

Figure 10:
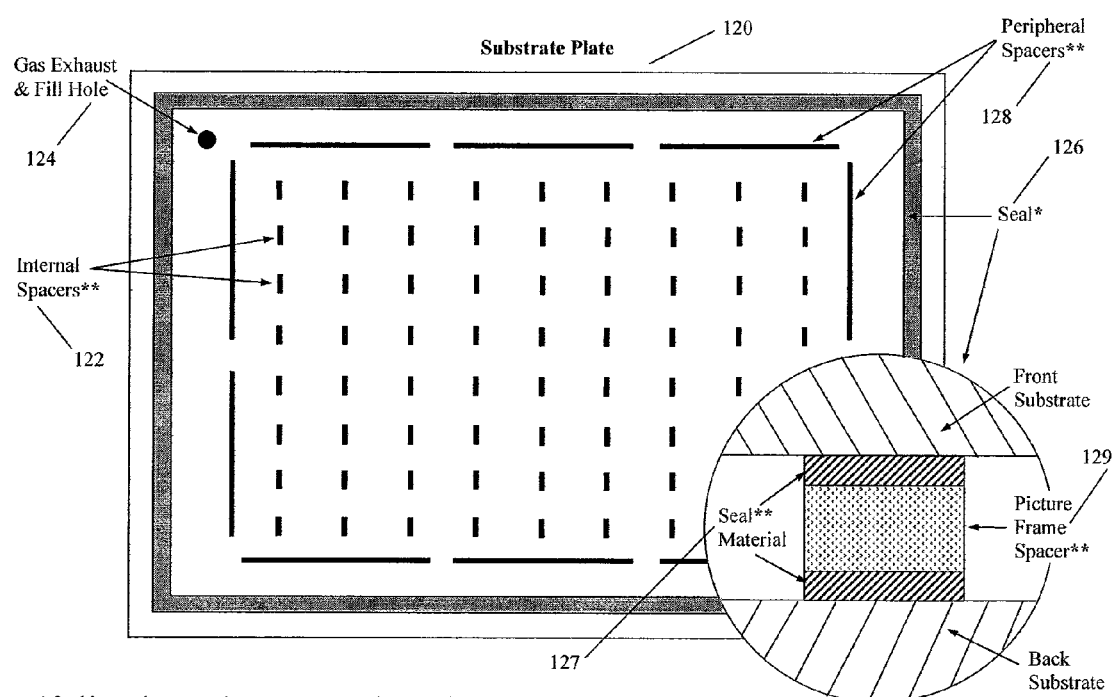
FIG. 10 illustrates a picture-frame type, spacer-seal arrangement in accordance with one embodiment of the present invention.

Spacers: There are two types of spacers as shown in FIG. 10: peripheral and internal. Peripheral (or perimeter) spacers are long (i.e., inches in length) and are positioned close to the panel perimeter, just inside the seal area. Peripheral spacers are used primarily for holding the seal thickness so as to maintain the proper panel gas gap. Internal spacers are placed within the panel active discharge region and are usually much shorter in length (i.e., can be as small as just a few pixels long), but can be as long as an entire electrode row or column in a spacer-barrier rib structure (not shown). In general, internal spacers tend to be applied sparingly at only a few necessary positions, just enough to maintain structural integrity in terms of holding a uniform panel gas gap, and may not be necessary at all for small panel sizes or for medium size panels in which the internal gas pressure is very close to the external ambient pressure. For surface-discharge configurations (e.g., SD-PPS and DSD-PPS), the need for internal spacers is reduced as maintaining a uniform gas gap is not so critical. However, in order to achieve gas gaps on the order of inches in a surface-discharge structure, the use of a picture-frame, perimeter spacer/seal arrangement (or other such similar configuration) is necessary (see FIG. 10). The picture-frame spacer preform itself can be made of any material, although making it conductive would minimize possible problems associated with stored charge. Finally, in a barrier-rib type structure, the spacer ribs act as both internal spacers and as barriers to discharge-spreading. In order for the barrier-ribs to avoid wall-charge storage, they should be partially conductive to "bleed" off stored charge that tends to get trapped on cell surfaces.

Gas: The "empty space", or void, in-between the two substrates is filled with an appropriate gas mixture at an appropriate pressure per the foregoing discussions. The standard methods used to seal PDPs would be employed to seal the above-described two substrates together (see below), thus forming a chamber to contain the gas. The gas most likely will be a Penning type mixture with an avalanche inhibiter, such as: 98% Xe/2% $O_2$. If spacer-barriers are used, they must be configured to allow proper gas distribution. To maintain a uniform gas gap without the use of internal spacers in medium size PPS devices, the gas-fill pressure should be equal to, or very close to, the ambient pressure of ~700 torr. There are several mechanical means by which this can be accomplished which are beyond the scope of the present invention.

Sealing: The plasma panel seal must maintain a long-term, gas-tight, hermetic barrier under pressure and mechanical stresses. The seal must also include a gas-exchange port mechanism as shown in FIG. 10, and be consistent with setting the proper gas gap in the panel. In general, the seal technology employed for commercial PDPs will be employed in the fabrication of PPS devices.

FIG. 10 illustrates one embodiment of the above described picture-frame type, spacer-seal arrangement on what most likely would be a back plate substrate 120, and differs significantly from a seal used in a typical PDP. Back plate 120 includes a gas exhaust and fill hole 124, internal spacers 122, peripheral spacers 128, and a seal 126. Seal 126 includes seal material 127 and picture-frame spacer 129 between the front and back substrate. In most embodiments, the picture-frame spacer seal, peripheral spacers and internal spacers would all have similar height to maintain a uniform gas gap across the panel. The seal arrangement shown in FIG. 10 is for use primarily in very large gas gap, SD-PPS and DSD-PPS configurations where the gap is on the order of that employed in GM-tubes (e.g. 1-10 mm). In this arrangement, the seal material would be coated as a continuous layer or bead, both above and below the picture-frame flat surface as shown in FIG. 10.

As described, embodiments of the present invention utilize a plasma panel structure in conjunction with detection electronics to form a plasma panel based detection device that can be manufactured for relatively low cost. A number of embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An ionizing-radiation counting detector comprising:
   a first substrate;
   a second substrate generally parallel to said first substrate and forming a gap with said first substrate;
   at least one spacer to define said gap;
   a gas contained within said gap;
   at least one first electrode coupled to said second substrate;
   at least one second electrode electrically coupled to said first electrode and defining at least one pixel with said first electrode;
   a first impedance coupled to said first electrode;
   a second impedance coupled to said second electrode;
   a power supply coupled to at least one of said electrodes;
   a first discharge event detector circuitry coupled to said first impedance for detecting a gas discharge counting event in said first electrode;
   a second discharge event detector circuitry coupled to said second impedance for detecting the gas discharge counting event in said second electrode;
   a plurality of pixels, each pixel capable of outputting a gas discharge pulse upon interaction with ionizing-radiation, wherein each gas discharge pulse is counted as having approximately an equal value; and
   circuitry for detecting if a gas discharge pulse is output from the pixels, and for counting each gas discharge pulse as an individual event.

2. The ionizing-radiation counting detector of claim 1, wherein said first electrode is an X-electrode and said second electrode is a Y-electrode.

3. The ionizing-radiation counting detector of claim 1, further comprising:
   at least one first driver coupled to said first electrode; and
   at least one second driver coupled to said second electrode.

4. The ionizing-radiation counting detector of claim 1, wherein the detector forms a multi-layer detector through vertical stacking.

5. The ionizing-radiation counting detector of claim 1, wherein said power supply is a direct current power supply.

6. The ionizing-radiation counting detector of claim 1, wherein said power supply is an alternating current power supply.

7. The ionizing-radiation counting detector of claim 1, wherein said second electrode is coupled to said first substrate.

8. The ionizing-radiation counting detector of claim 1, further comprising at least one impedance coupled in series with each of said pixels.

9. The ionizing-radiation counting detector of claim 1, further comprising an internal barrier wall structure to physically isolate said pixels.

10. The ionizing-radiation counting detector of claim 1, wherein said second electrode is coupled to said second substrate.

11. The ionizing-radiation counting detector of claim 1, further comprising a hermetic seal coupling said first substrate to said second substrate.

12. The ionizing-radiation counting detector of claim 10, wherein a gas discharge between said first and second electrodes is a surface-discharge shape.

13. The ionizing-radiation counting detector of claim 10, further comprising a conversion layer coupled to said first substrate and facing the gas.

14. The ionizing-radiation counting detector of claim 10, wherein said first substrate is a conversion plate.

15. The ionizing-radiation counting detector of claim 10, further comprising at least one impedance coupled in series with each of said pixels.

16. The ionizing-radiation counting detector of claim 10, further comprising an internal barrier wall structure between said first and second substrates to physically separate said pixels.

17. The ionizing-radiation counting detector of claim 10, wherein the detector forms a multi-layer detector through vertical stacking.

18. The ionizing-radiation counting detector of claim 13, further comprising at least one impedance coupled in series with each of said pixels.

19. The ionizing-radiation counting detector of claim 13, further comprising an internal barrier wall structure between said first and second substrates to physically separate said pixels.

20. The ionizing-radiation counting detector of claim 13, wherein the detector forms a multi-layer detector through vertical stacking.

21. An ionizing-radiation counting detector comprising:
   a first substrate;
   a second substrate generally parallel to said first substrate and forming a gap with said first substrate;
   at least one spacer to define said gap;
   a gas contained within said gap;
   at least one first electrode coupled to said second substrate;
   at least one second electrode physically coupled to said second substrate and electrically coupled to said first electrode and defining at least one pixel with said first electrode;
   a first impedance coupled to said first electrode;
   a second impedance coupled to said second electrode;
   a first power supply coupled to at least one of said electrodes that are coupled to said second substrate;
   a first discharge event detector circuitry coupled to said first impedance for detecting a gas discharge counting event in said first electrode;
   a second discharge event detector circuitry coupled to said second impedance for detecting the gas discharge counting event in said second electrode;
   at least one third electrode physically coupled to said first substrate;
   at least one fourth electrode physically coupled to said first substrate and electrically coupled to said third electrode, and defining at least one pixel with said third electrode;
   a third impedance coupled to said third electrode;
   a fourth impedance coupled to said fourth electrode;
   a second power supply coupled to at least one of said electrodes that are coupled to said first substrate;
   a third discharge event detector circuitry coupled to said third impedance for detecting a gas discharge counting event in said third electrode;
   a fourth discharge event detector circuitry coupled to said fourth impedance for detecting the gas discharge counting event in said fourth electrode;

a plurality of pixels, each pixel capable of outputting a gas discharge pulse upon interaction with ionizing-radiation, wherein each gas discharge pulse is counted as having approximately an equal value; and circuitry for detecting if a gas discharge pulse is output from the pixels, and for counting each gas discharge pulse as an individual event.

22. The ionizing-radiation counting detector of claim 21, wherein said third electrode is perpendicular to said first electrode on said second substrate and said fourth electrode is perpendicular to said second electrode on said second substrate.

23. The ionizing-radiation counting detector of claim 21, wherein said third electrode is parallel to said first electrode on said second substrate and said fourth electrode is parallel to said second electrode on said second substrate.

24. The ionizing-radiation counting detector of claim 21, further comprising a hermetic seal coupling said first substrate to said second substrate.

25. The ionizing-radiation counting detector of claim 21, wherein the detector forms a multi-layer detector through vertical stacking.

26. The ionizing-radiation counting detector of claim 21, further comprising at least one impedance coupled in series with each of said pixels.

27. The ionizing-radiation counting detector of claim 21, further comprising an internal barrier wall structure to physically isolate said pixels.

28. A method of detecting ionizing-radiation based on a counting of gas discharge events comprising:

receiving ionizing-radiation at a first substrate of a surface-discharge plasma panel, said surface-discharge plasma panel having a second substrate;

creating at least one free-electron within a conversion layer coupled to said first substrate in response to the received ionizing-radiation, said creating resulting in an emittance of an electron out of said conversion layer and into a gas contained within a gap between said first and second substrates;

causing a gas-discharge event at a pixel site of an X-electrode and a Y-electrode on the second substrate of the surface-discharge plasma panel; and counting a plurality of said events at a first pulse detector coupled to the X-electrode and at a second pulse detector coupled to the Y-electrode, wherein each of said events is counted as approximately a same value.

* * * * *